United States Patent [19]
Sato et al.

[11] Patent Number: 5,627,731
[45] Date of Patent: May 6, 1997

[54] COMPACT ELECTRONIC APPARATUS AND METHOD OF ASSEMBLING THE SAME

[75] Inventors: Youji Sato, Yokohama; Yuji Nakajima, Tokyo; Kinji Taki, Tokyo; Toshikazu Konno, Tokyo, all of Japan

[73] Assignee: Kabushiki Kaisha Toshiba, Kanagawa-ken, Japan

[21] Appl. No.: 615,123

[22] Filed: Mar. 13, 1996

Related U.S. Application Data

[62] Division of Ser. No. 520,754, Aug. 29, 1995, which is a division of Ser. No. 107,948, Aug. 16, 1993, Pat. No. 5,455,746.

[30] Foreign Application Priority Data

| Sep. 17, 1992 | [JP] | Japan | 4-248361 |
| Sep. 17, 1992 | [JP] | Japan | 4-248362 |
| Sep. 30, 1992 | [JP] | Japan | 4-262555 |
| Sep. 30, 1992 | [JP] | Japan | 4-262556 |
| Mar. 29, 1993 | [JP] | Japan | 5-070446 |

[51] Int. Cl.$^6$ .................................... H05K 7/14
[52] U.S. Cl. .................. 361/796; 361/798; 361/801; 439/61; 439/325; 174/35 GC
[58] Field of Search ........................ 361/796, 752, 361/798, 800, 801, 802, 803, 816; 174/17 R, 35 R, 35 GC; 439/154, 155, 156, 157, 158, 159, 325, 61; 211/41

[56] References Cited

U.S. PATENT DOCUMENTS

| 5,031,027 | 7/1991 | Dorinski et al. | 357/74 |
| 5,051,868 | 9/1991 | Leverault et al. | 361/395 |
| 5,121,295 | 6/1992 | Lam | 361/395 |
| 5,121,297 | 6/1992 | Haas | 361/398 |
| 5,136,468 | 8/1992 | Wong et al. | 361/393 |
| 5,148,350 | 9/1992 | Chan et al. | 361/386 |
| 5,224,019 | 6/1993 | Wong et al. | 361/393 |
| 5,224,024 | 6/1993 | Tu et al. | 364/429 |
| 5,324,204 | 6/1994 | Lwee | 439/64 |

FOREIGN PATENT DOCUMENTS

| 0443717A2 | 8/1991 | European Pat. Off. | H05K 3/36 |
| 2633754A1 | 1/1990 | France. | |
| 3294917 | 12/1991 | Japan | G06F 1/16 |
| 2226192A | 6/1990 | United Kingdom. | |

OTHER PUBLICATIONS

T.E. Bell, "Incredible Shrinking Computers," IEEE Spectrum 28 (1991) May, No. 5, New York, pp. 37–41.

*Primary Examiner*—Leo P. Picard
*Assistant Examiner*—Anthony Dinkins
*Attorney, Agent, or Firm*—Limbach & Limbach LLP

[57] ABSTRACT

A personal computer comprises a housing having a bottom wall. A plurality of functional components are arranged side by side on the bottom wall of the housing. A fixture plate is arranged on top of the functional components and secured to the functional components and the bottom wall by means of screws. The functional components are held between the fixture plate and the bottom wall.

2 Claims, 22 Drawing Sheets

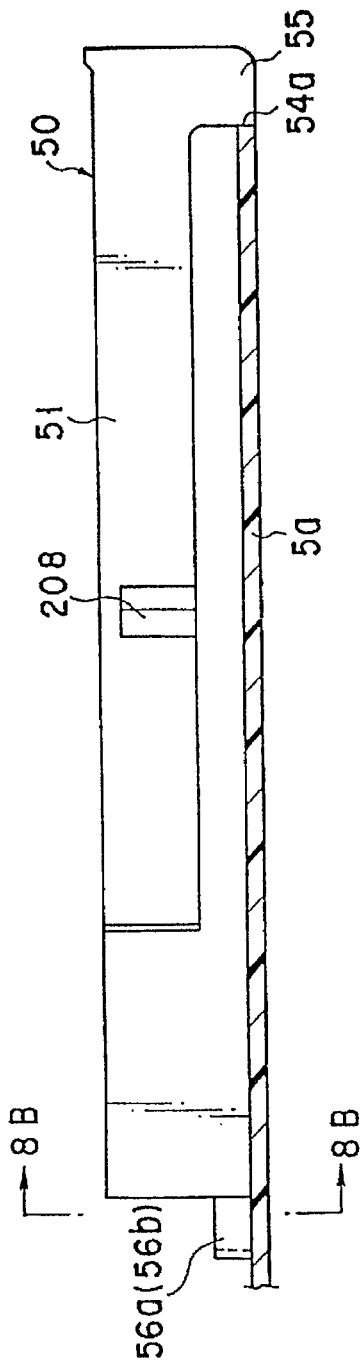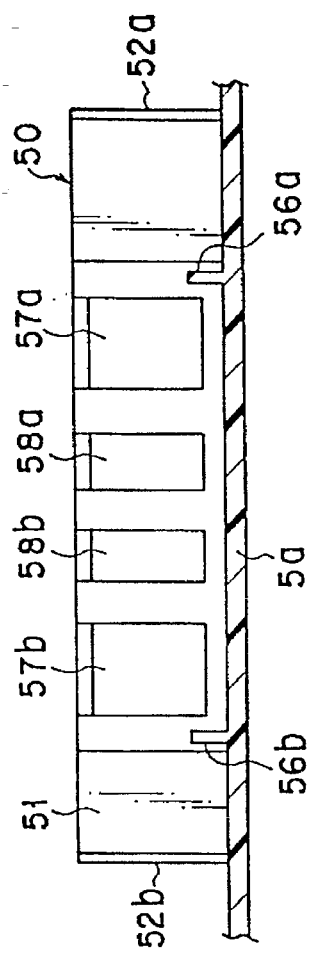
FIG. 8A
FIG. 8B

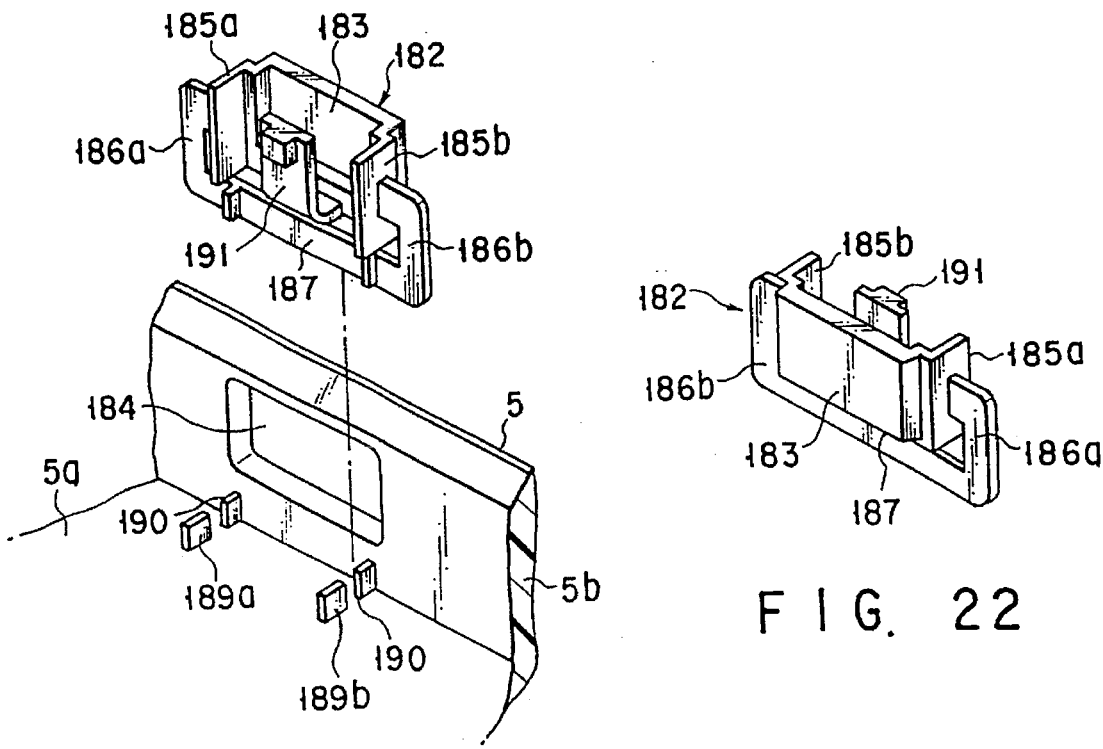
FIG. 21
FIG. 22
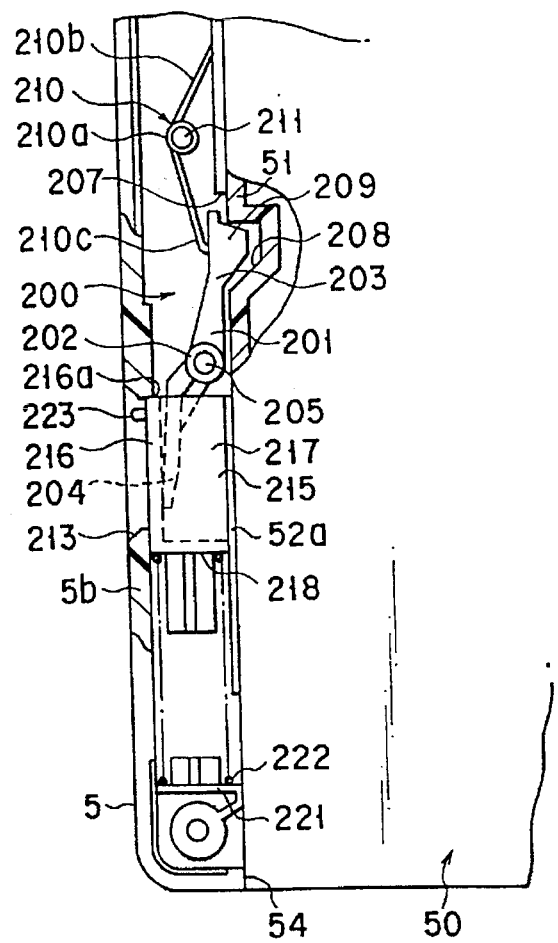
FIG. 23

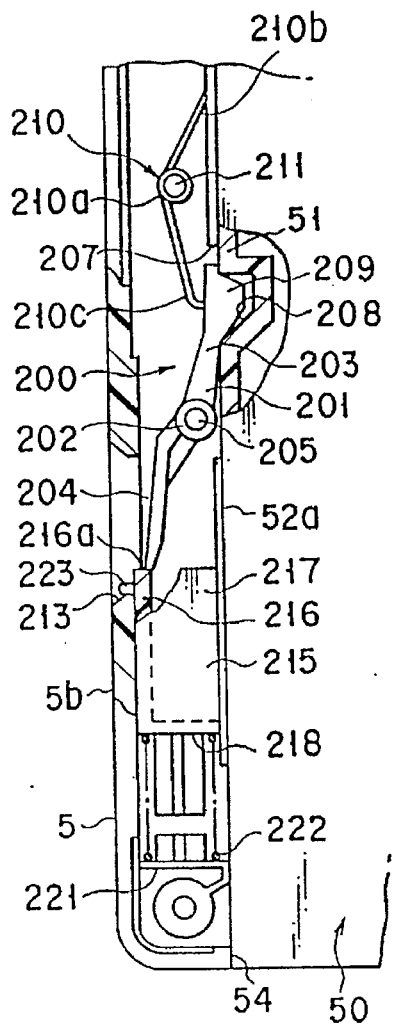
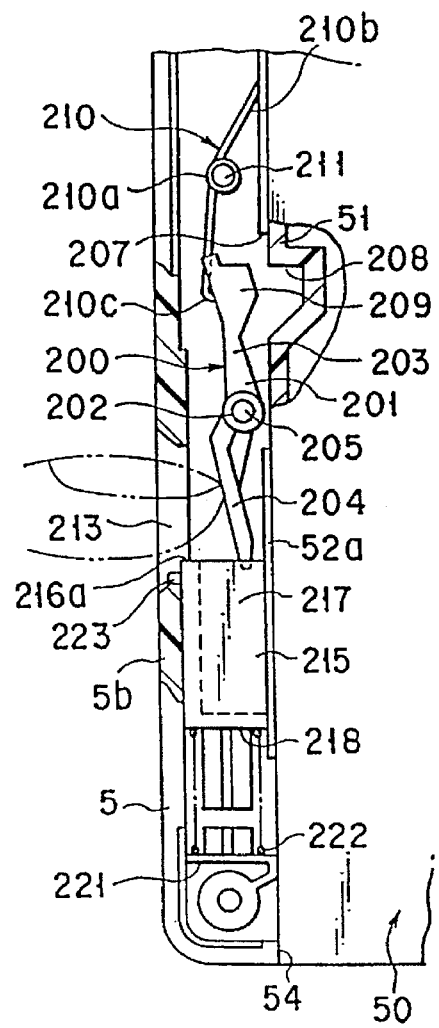
F I G. 24A        F I G. 24B
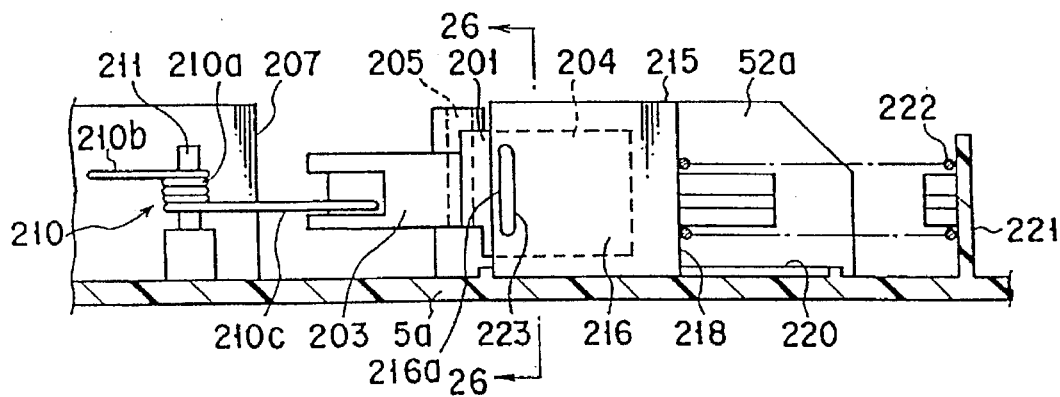
F I G. 25

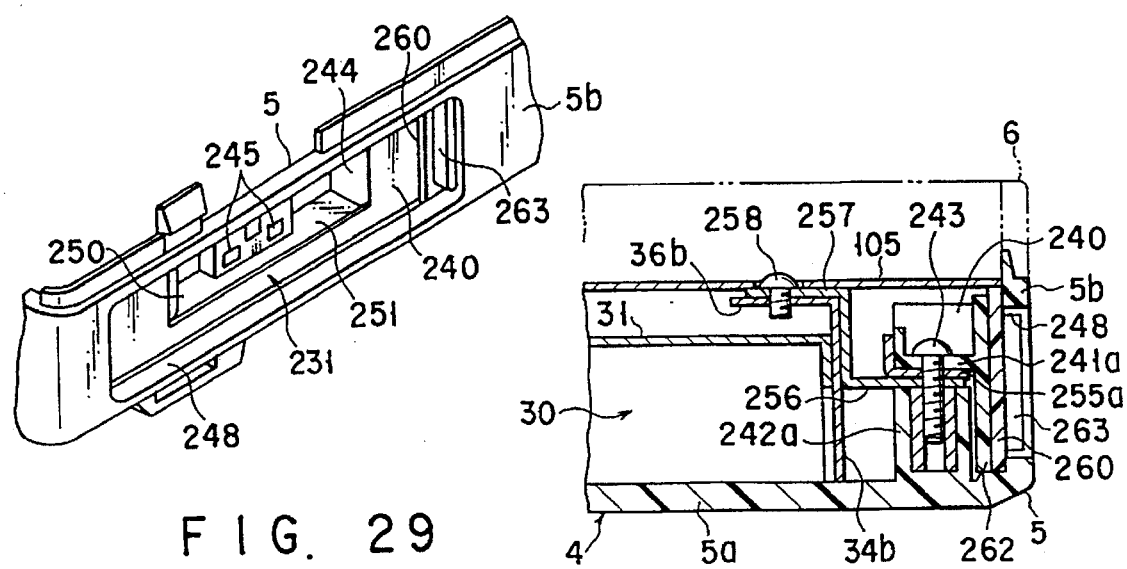
FIG. 29
FIG. 30
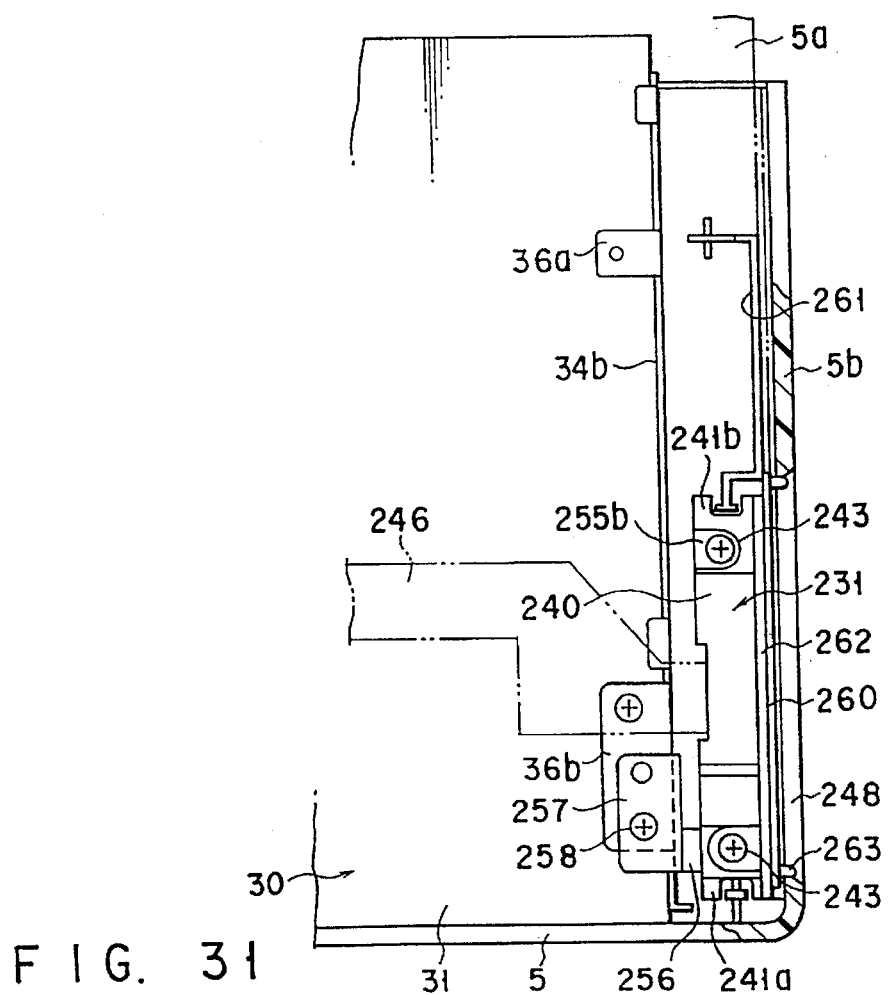
FIG. 31

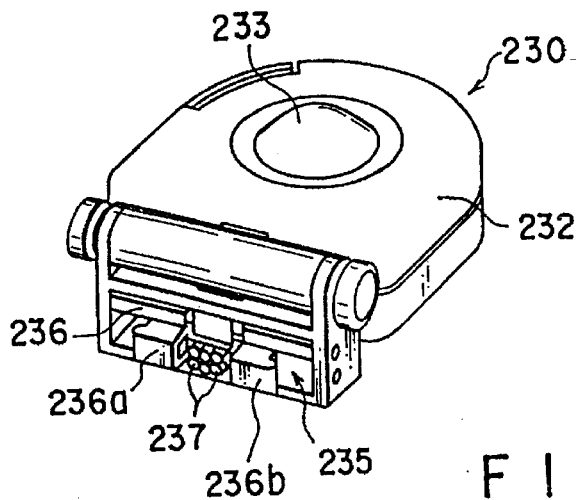
F I G. 32
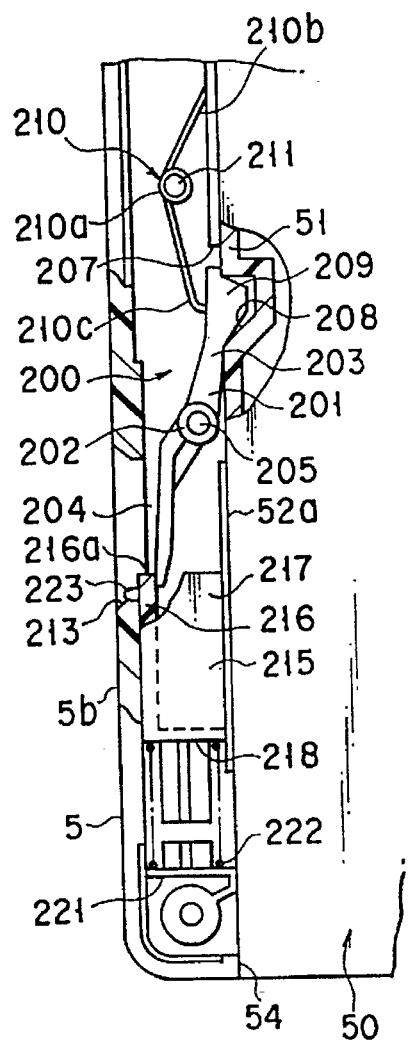
F I G. 33

COMPACT ELECTRONIC APPARATUS AND METHOD OF ASSEMBLING THE SAME

This is a divisional of application Ser. No. 08/520,754 filed Aug. 29, 1995, which was a divisional of application Ser. No. 08/107,948, filed Aug. 16, 1993, now U.S. Pat. No. 5,455,746.

BACKGROUND OF THE INVENTION

1. Field of the Invention

This invention relates to a portable electronic apparatus such as a book shaped personal computer or a word processor and, more particularly, to a portable electronic apparatus comprising a synthetic resin housing containing therein various functional components such as a floppy disc drive, hard disc drive, and the like, and a method of assembling the same.

2. Description of the Related Art

Recently, there are known book or notebook-shaped portable computers having a flat box like base unit on which a keyboard and a display unit with a flat display panel are mounted.

A portable computer of the above identified type normally comprises a synthetic resin housing that provides a frame for a base unit and contains therein various functional components such as a floppy disk drive and/or a hard disc drive along with circuit board carrying thereon various circuit components. These functional components are normally supplied in the form of modules and placed in positions on the bottom wall of the housing, where they are then secured by means of screws to the bottom wall.

Upon assembling the conventional portable computers of this type, however, each of the functional components placed on the bottom wall is required to be independently secured by screws to the bottom wall. Thus, the attachment of the components is very troublesome, and thus, the assembling of the computer takes large time periods.

Further, the bottom wall of such a housing has a rather complicated profile because bosses for receiving screws should be provided on the bottom wall at positions on which functional components are placed. These bosses inevitably reduce the space inside the housing that can otherwise be used to accommodate components. In recent portable computers, it is desired that the housing is reduced in size in order to improve the portability of the computer. However, if the mounting space in the housing is reduced by the bosses, it is necessary to increase the size of the housing so as to increase the mounting space thereof, which opposes the requirement for providing a compact computer.

In addition to the various functional components, the housing of a portable computer contains therein a circuit board on which various circuit components are mounted. This circuit board normally has a rectangular shape substantially corresponding to the size of the bottom wall of the housing. So the space on the bottom wall is substantially occupied by the circuit board.

In order to improve the portability of the recent computers, it is required to reduce the length and the width of the housing. Thus, the mounting space in the housing tends to be further reduced in size, and forces the circuit board to be made further smaller. For solving this problem, there is proposed an arrangement wherein a single relatively large circuit board is divided into a plurality of small parts. The divided board are arranged in the housing such that they are overlapped with one another and connected to one another by means of flexible connecting boards.

Some of the circuit components carried by the circuit boards generate high frequency noises during operation. Such high frequency noises can interfere with wired as well as wireless telecommunications when leak out of the housing. Therefore, in conventional portable computers, the inner surface the housing of is normally coated with a conductive layer typically by plating so as to provide the housing with an electromagnetic shield effect. The circuit boards and other electronic components of the computer are enclosed with the conductive layer.

With such an arrangement, however, the circuit boards are apt to move relative to each other as they are connected together by flexible connecting boards, making the mutual connection of the boards unstable. This means that, when securing one of the circuit boards to the housing, it may accidentally shake the other circuit boards connected to it, causing them to hit and damage the conductive layer on the inner surface of the housing with their corners and edges and/or the components carried on them until eventually the conductive layer partly comes off from the cabinet and loses its electromagnetic shield effect.

In order to avoid such problem, it is necessary to carefully assemble the circuit board in the housing, thereby making the assembly troublesome. Additionally, the housing needs to be provided with a large number of bosses for screws for securing a plurality of circuit boards to the housing in a multilayered manner. Such additional bosses make the housing even more rugged and the efficiency of assembling a portable computer by using such a large number of screws to be driven into a rugged housing is inevitably low.

In a portable computer of the type under consideration, if a user desires to use application software and/or an application device, it is often required to be modified the computer by arranging additional components on the circuit substrates and/or replacing some of the existing components with improved ones in accordance with the application software and/or the application devices to be used. The multilayer arrangement of a plurality of circuit boards as described above then needs to be so devised as to facilitate such addition and/or replacement of circuit components without being disturbed by the circuit boards.

A portable computer of the above mentioned type is normally provided with a rechargeable battery pack for supplying power to the computer even when no commercial power supply is available. Such a battery pack may need replacement when it is time worn and has lost its rechargeability and therefore it is normally removably fitted to the base unit. In other words, the base unit of a conventional portable computer is provided with a storing space for storing a battery pack and a manually releasable lock mechanism for locking the battery pack in the storing space.

The lock mechanism comprises a knob with which the operator of the computer can control it by using a finger tip. The knob is usually exposed at a lateral side or the bottom of the base unit. The operator can release the lock mechanism by sliding the knob sideways with a finger tip and take the battery pack out of the base unit.

If the knob is exposed outside the housing, although it may be easily operable, it is subject to the danger of accidental release of the lock mechanism. Although the problem may be avoided by arranging a knob cover on the base unit, the provision of the knob cover gives rise to another problem of requiring a two-step operation of opening the cover or holding it in a position for exposing the knob and then sliding the knob before taking out the battery pack.

Furthermore, once the battery pack is recharged or replaced and put back in position, the knob cover needs to be slid back or reattached to the base unit, imposing an additional manual work on the operator. If the knob cover is not returned to its proper position, on the other hand, the knob remains in an exposed condition, leaving the lock mechanism unprotected against improper handling.

Portable computers are generally provided with expansion slots for receiving so-called expansion substrates for expansion features. In line with the recent trend of using card-shaped standardized substrates for expansion features, the PC Memory Card International Association (PCMCIA) in the U.S.A. has proposed four types of standardized cards as listed below.

Type 1: thickness 3.3 mm; type 2: thickness 5.0 mm; type 3: thickness 10.5 mm; thick type: thickness 18.00 mm.

Cards of types 1 and 2 are mostly used for IC memory cards that carry semiconductor memories thereon and find a variety of applications including those of security cards and cards of type 3 are often used as small card discs for I/O features, whereas cards of thick type find applications including those of I/O, LAN (local Area Network), FAX and modem features.

However, the fact that the PCMCIA has proposed such diverse standards clearly shows how standardization is difficult for cards of the sort discussed above. Particularly where portable electronic apparatuses need to meet the requirement of downsizing, it is extremely difficult to provide housings that are compatible with all standardized cards and at the same time satisfy the requirement of reduced outer dimensions of apparatus.

SUMMARY OF THE INVENTION

In view of the above described circumstances, it is therefore an object of the present invention to provide a portable electronic apparatus and a method of assembling the same, wherein a plurality of functional components can be easily placed in and fixed to the housing with a single operation to facilitate the overall assembling operation.

It is another object of the invention to provide a portable electronic apparatus wherein a housing has a simple profile that allows functional components to be installed in a highly space saving manner without enlarging the dimensions of the housing.

It is still another object of the invention to provide a portable electronic apparatus wherein synthetic resin components and metal components of the housing can be easily separated from each other so that it may be effectively disposed as waste without damaging the environment as its recyclable components can be completely recovered once its service life is over.

It is further object of the invention to provide a portable electronic apparatus which can securely shield noises generated from electronic parts on circuit boards which are arranged in a housing in a multilayered manner, and wherein the circuit boards can be easily installed in the housing, thereby facilitating the assembly of the apparatus.

It is still further object of the invention to provide a portable electronic apparatus wherein even if a shutter for covering a lock lever is provided, the lock lever can be easily operated and is so arranged that, once the finger tip operating the lock lever is removed from the latter, the shutter is automatically released from its suspended position and comes to cover the lock lever again, not allowing itself to be held away from the proper position for covering the lock lever.

It is another object of the invention to provide a portable electronic apparatus capable of selectively receiving differently sized cards which are based on a common standard.

In order to achieve the above object, a portable electronic apparatus according to an aspect of the present invention comprises a housing having a bottom wall; a plurality of functional components arranged side by side on the bottom wall and a fixture plate arranged on the functional components for holding the functional components between the fixture plate and the bottom wall as the fixture plate is secured to the functional components and the bottom wall by means of screws.

Preferably, the bottom wall of the housing is provided with a plurality of bosses for receiving screws.

With the portable electronic apparatus having a configuration as described above, the functional components arranged on the bottom wall of the housing are rigidly secured to the housing as they are held between the fixture plate and the bottom wall in a single operation and, therefore, the functional components do not need to be individually secured to the bottom wall with screws. Consequently, the entire operation of assembling the portable electronic apparatus can be remarkably simplified.

If the bottom wall of the housing is provided with bosses for receiving screws, their arrangement does not need to correspond with that of the individual functional components and, therefore, only a small number of screws and hence bosses are required. Consequently, the housing is simple in structure, and that space in which conventional bosses are provided can be made available for mounting the functional components. Thus, functional components may be placed closer to one another and the bottom wall to efficiently use the limited space defined in the housing.

Preferably, one of two adjacent functional components provided on the bottom wall of the housing includes a holding portion located over the other functional component, and the holding portion is secured to a boss of the housing. With this arrangement, any two adjacent functional components may be jointly secured to the housing cabinet, thereby reducing the number of screws required to securely hold the functional components to the housing and that of bosses to be formed on the housing. Consequently, the housing may have a simplified profile and the time and cost for assembling the entire apparatus will be significantly reduced.

It is preferable for the functional components to be provided with a lug to be secured to the housing with the fixture plate by means of a screw. With such an arrangement, since each of the functional components and the fixture plate can be secured to the housing by means of a common screw, the total number of screws and bosses required for the entire apparatus can be remarkably reduced.

It is also preferable that, if the functional components include circuit parts generating noises in operation, the fixture plate is made of metal. Then, any high frequency noises generated from any of the functional components can be shielded within the space defined by the fixture plate and the housing to eliminate the possibility for the noises to interfere with wire as well as wireless telecommunications if they leak out of the housing.

According to another aspect of the present invention, there is provided a portable electronic apparatus comprising a synthetic resin housing having a bottom wall; a plurality of functional components arranged side by side on the bottom wall and having metal parts; and a metal fixture plate arranged on top of the functional components for holding the functional components between the fixture plate and the bottom wall as the fixture plate is secured to the functional components and the bottom wall by means of screws.

With a portable electronic apparatus having an above described configuration, the functional components can be removed from the housing in a single operation of unscrewing the fixture plate. Therefore, the synthetic resin housing can be easily separated from the metal fixture plate and the functional components having metal parts when the service life of the apparatus is over and the apparatus is to be disposed as waste so that any recyclable parts of the apparatus may be recovered as resources.

According to still another aspect of the invention, there is provided a method of assembling a portable electronic apparatus comprising the steps of arranging a plurality of functional components, each provided as a module, on the bottom wall of a housing; laying a fixture plate on top of said functional components; and securing the fixture plate to the housing and the functional components by means of screws to rigidly hold the functional components between the bottom wall of the housing and the fixture plate.

With such a method of assembling a portable electronic apparatus, a plurality of functional components can be secured to their respective proper positions only by the operations of laying a fixture plate on top of the functional components and securing the fixture plate to the housing and the functional components by means of screws once the components are placed in position on the bottom wall of the housing, the functional components do not need to be individually secured to the bottom wall as in the case of conventional assembling methods. So the overall operation of assembling functional components and other components into a portable electronic apparatus is remarkably simplified and therefore can be carried out in an effective and efficient manner.

According to still another aspect of the invention, there is provided a portable electronic apparatus comprising a synthetic resin housing; a plurality of rigid circuit boards arranged inside the housing one above another to form a multilayered structure and carrying thereon electronic circuits which include ones generating noises during operation; and a flexible connecting board for electrically connecting the circuit boards. The circuit boards are surrounded by a pair of shield members and contained within the housing. The pair of shield members are superposed with each other and each member is provided on its surface facing the other member with receiving portions to which the circuit board is fixed. The shield members are superposed while the circuit boards are fixed to the receiving portions, thereby constituting a board unit wherein the circuit boards are held between the shield members while being superposed with each other and surrounded by the shield members. The board unit is enclosed in the housing.

Preferably, in order to accommodate circuit substrates arranged in three layers within a limited space, one of the superposed shield members is provided with an additional receiving portion projecting toward the opposite shield member beyond the first receiving portion, for receiving and securely holding another circuit board.

With such an arrangement, once the circuit substrates are secured to the respective receiving portions of the shield members and the shield members are superposed with each other, the circuit boards are automatically laid one above another to form a multilayer structure and surrounded by the shield members.

Thus, the circuit boards that are mutually and electrically connected by means of flexible connecting board are arranged one above another like so many shelves to form a unit with the shield members surrounding them before they are mounted on the housing so that they may be housed in the housing without losing their safe and stable posture. Since the layered circuit boards are surrounded by the shield members, no additional conductive layers are required to be arranged inside the housing to electromagnetically shield them. Additionally, since the shield members formed of a metal are by far mechanically stronger than a conventional conductive layer prepared by plating, they are least likely to be damaged during assembling of the circuit boards into a portable electronic apparatus the shield members are, therefore capable of effectively containing within them any noises that may be generated by the components of the apparatus.

Since the circuit boards mutually and electrically connected by means of a flexible connecting board are housed in the housing as a unit along with the shield members, it may be apparent that the housing only needs to be provided with means for rigidly holding either one of the shield members. This means that the housing may have a simplified inside configuration as compared with a conventional housing provided with means for rigidly holding a plurality of circuit boards. This fact and the fact that the circuit boards form a unit with the physically strong shield members can greatly simplify the operation of assembling the circuit boards into a portable electronic apparatus.

Preferably, more than two of the circuit boards may be arranged on one of the shield members in two layers. Thus, there will be formed three layers of circuit boards that are surrounded by the shield members by simply interposing the shield members together. Accordingly, three circuit boards superposed with each other can be easily assembled in a limited space of the housing.

According to still another aspect of the invention, there is provided a portable electronic apparatus which comprises a housing having a peripheral wall and a storage space defined by the peripheral wall; a storage member removably stored within the storage space; and a manually releasable lock mechanism for locking the storage member within the storage space.

The lock mechanism includes a lock lever supported by the housing to be rotatable toward and away from the storage member, the lock lever having an engaging portion for releasably engaging the storage member and a pressing portion extending in a direction opposite to that of the engaging arm with respect to the pivot of the lock lever. The lock lever is constantly urged by a first spring in a direction wherein the engaging portion engages the storage member. The housing is provided with a window formed in the peripheral wall to expose the pressing portion of the lock lever. A shutter is arranged on the housing and slidable between a closed position where it is located between the window and the pressing portion of the lock lever to close the window and an opened position where it is moved away from between the window and the pressing portion to expose the window, the shutter being urged toward the closed position by a second spring. The shutter may have an edge which seizes the end of the pressing portion when the shutter is moved to its opened position against the urging force of the second spring.

With a lock mechanism having the above described configuration, when a storage member is stored in the storage space, the engaging portion of the lock lever comes to be engaged with the storage member to immovably hold it in position. To unlock the storage member, the shutter is slidingly moved to its open position to expose the window by forcibly inserting a finger tip through the window. When the shutter is moved to the open position, it is spaced away from the pressing portion of the lock lever. Since the lock lever is urged to rotate by the first spring, the lock lever is rotated further as the shutter is away from the pressing portion of the lock lever until the end of the pressing portion comes right opposite the corresponding edge of the shutter. Since the shutter is urged to move toward the closed position by the second spring, the edge of the shutter seizes the end of the pressing portion and consequently the shutter is held to the opened position to expose the window if the finger tip is moved away from the shutter. Under this condition, the pressing portion of the lock lever is exposed outside the housing through the window.

Now, if the pressing portion exposed outside through the window is pushed inward by a finger tip, the lock lever is rotated against force of the first spring in the opposite direction until the engaging portion of the lock lever is disengaged from the storage member. Thus, the storage member is unlocked and readily taken out of the storage space of the housing.

If the pressing portion is pushed, the end of the pressing portion is removed from the edge of the shutter. So, if the finger tip pushing the pressing portion is drawn from the window and removed from the pressing portion, the shutter is forcibly pushed toward the closed position by the second spring to close the window.

According to still another aspect of the invention, there is provided a portable electronic apparatus comprising a housing having a card slot for storing a card of allowable maximum dimensions as defined by a selected standard; and a connector of appropriate dimensions as defined by the selected standard and arranged within the card slot.

A portable electronic apparatus having a configuration as described above is compatible with any cards having dimensions defined by the selected standard and, therefore, it is not necessary to provide at the housing with independent card slots corresponding to the cards. Thus, the space required for the housing to provide can be minimized.

According to further aspect of the invention, there is provided a portable electronic apparatus comprising a housing having a first card slot for receiving a card of allowable maximum dimensions as defined by a selected standard; and a second card slot for receiving a card of appropriate dimensions as defined by the selected standard.

With such an arrangement, the first card slot may be used to receive a card of appropriate dimensions such as an I/O card whereas the second card slot may be used to receive a different card such as a security card that will be frequently taken out and reinserted. Therefore, two different cords can be used simultaneously without significantly increasing the space required for the housing to provide for expansion features for the apparatus. Such an apparatus will prove to be remarkably advantageous if compared with conventional apparatuses.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 through 32 illustrates a portable electronic apparatus according to an embodiment of the present invention, in which:

FIG. 1 is a schematic perspective view of the apparatus, having its display unit swung open;

FIG. 2 is an exploded perspective view of the housing;

FIG. 3 is a perspective view showing a bottom case in which functional components such as a FDD and a HDD are mounted;

FIG. 4 is a sectional view of a base unit, illustrating the positional relationship of shield plates, a board unit and the HDD of the apparatus;

FIG. 5 is a perspective view of the computer having its display unit held in the closed position;

FIG. 6 is an exploded perspective view illustrating an area connecting the display unit and the base unit;

FIG. 7 is a perspective view showing a battery storage section of the bottom;

FIG. 8A is a sectional view showing a state wherein a battery pack is stored in the battery storage section;

FIG. 8B is a sectional view taken along line 8B—8B of FIG. 8A;

FIG. 9 is an exploded perspective view of a pair of shield members securely holding thereon respective circuit boards;

FIG. 10 is an exploded perspective view of a first shield member;

FIG. 11 is a plan view showing a plurality of circuit boards;

FIG. 12 is a perspective view showing a shield plate and a liquid crystal display supported in a recess of the shield plate;

FIG. 13 is an enlarged sectional view of an area of the shield plate where the liquid crystal display is anchored;

FIG. 14 is a sectional view of first and second card slots arranged in the housing and a cover for concealing and exposing the slots;

FIG. 15 is a schematic plan view of an expansion card;

FIG. 16 is a block diagram, illustrating the operation of the system for controlling the use of expansion cards;

FIG. 17 is an exploded view of the cover for concealing and exposing the card slots;

FIG. 18 is a right-side view of the computer;

FIG. 19 is a sectional view of a third card slot and a control button for operating a power switch;

FIG. 20 is a sectional view similar to FIG. 19 but showing a condition where the control button is depressed;

FIG. 21 is an exploded perspective view of the control button and an area of the bottom case where the control button is fitted;

FIG. 22 is a perspective of the control button;

FIG. 23 is a sectional view of a lock mechanism of a battery pack;

FIG. 24A is a sectional view showing a condition where the shutter is open to expose the lock lever of the lock mechanism;

FIG. 24B is a sectional view showing a condition where the lock lever of the lock mechanism is pushed by a finger tip to unlock the battery pack;

FIG. 25 is a sectional view showing the positional relationship between the shutter and the lock lever;

FIG. 26 is a sectional view taken along line 26—26 of FIG. 23;

FIG. 27 is a perspective view showing the positional relationship between the shutter and the lock lever;

FIG. 28 is an exploded perspective view of a structure of an expansion connector for connecting a ball point;

FIG. 29 is a perspective view of the expansion connector fitted to the bottom case;

FIG. 30 is a sectional view of the expansion connector fitted and grounded;

FIG. 31 is a plan view of the bottom case to which the expansion connector is fitted; and FIG. 32 is a perspective view of the ball point; and FIG. 33 is a sectional view of a lock mechanism according to a modification of the present invention.

DETAILED DESCRIPTION OF THE PREFERRED EMBODIMENTS

Now, the present invention will be described with reference to the accompanying drawing that illustrate a preferred embodiment of the invention.

Figure 1:
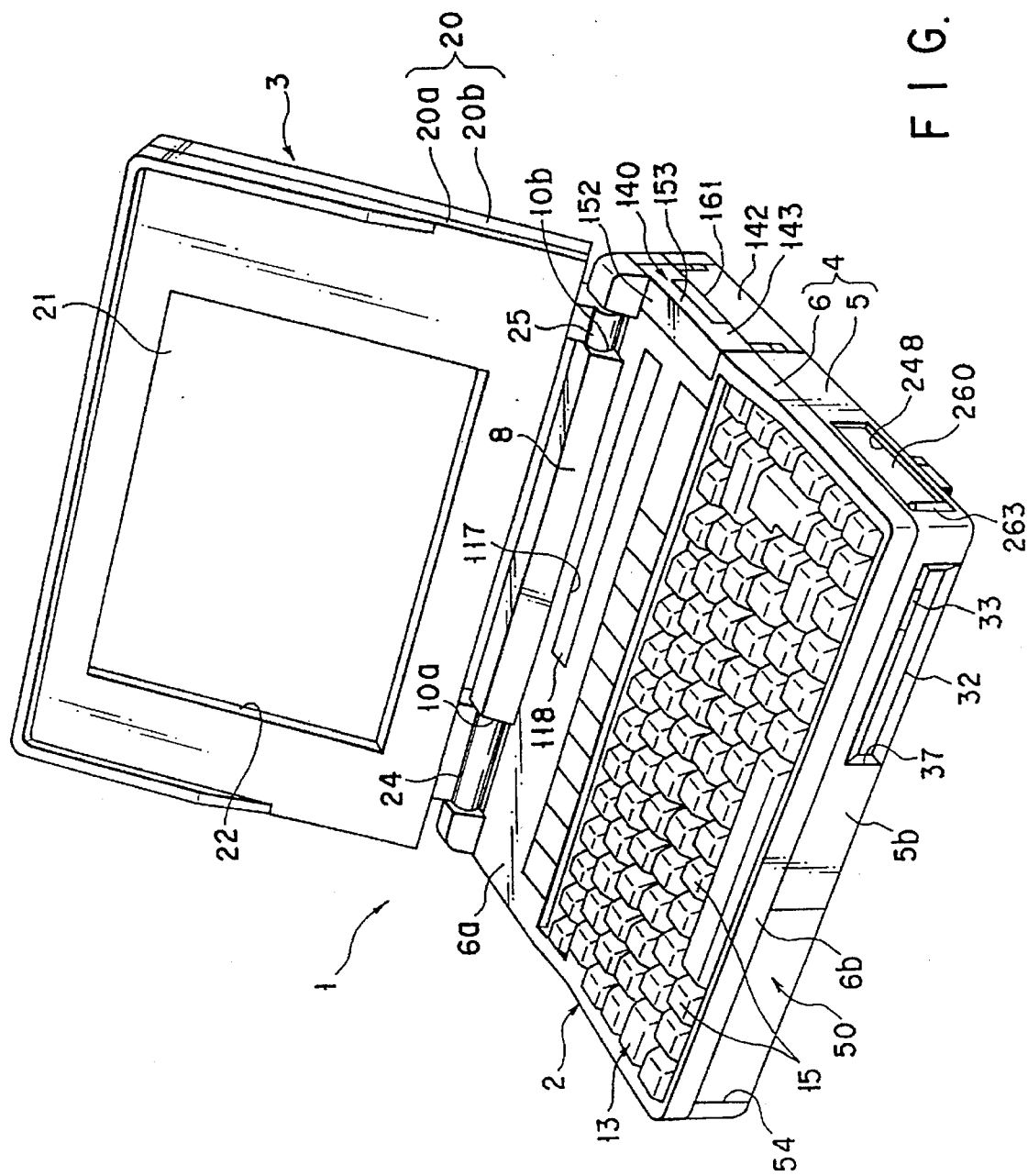

FIG. 1 shows a portable computer 1 sized to A4. The computer 1 comprises a flat box-shaped base unit 2 and a flat panel type display unit 3.

Housing 4 of the base unit 2 that defines the profile of the base unit 2 is divided into a bottom case 5 having a top opening and a top cover 6 for concealing the top opening of the bottom case 5. The bottom case 5 and top cover 6 are formed of a synthetic resin material such as ABS resin.

Figure 4:
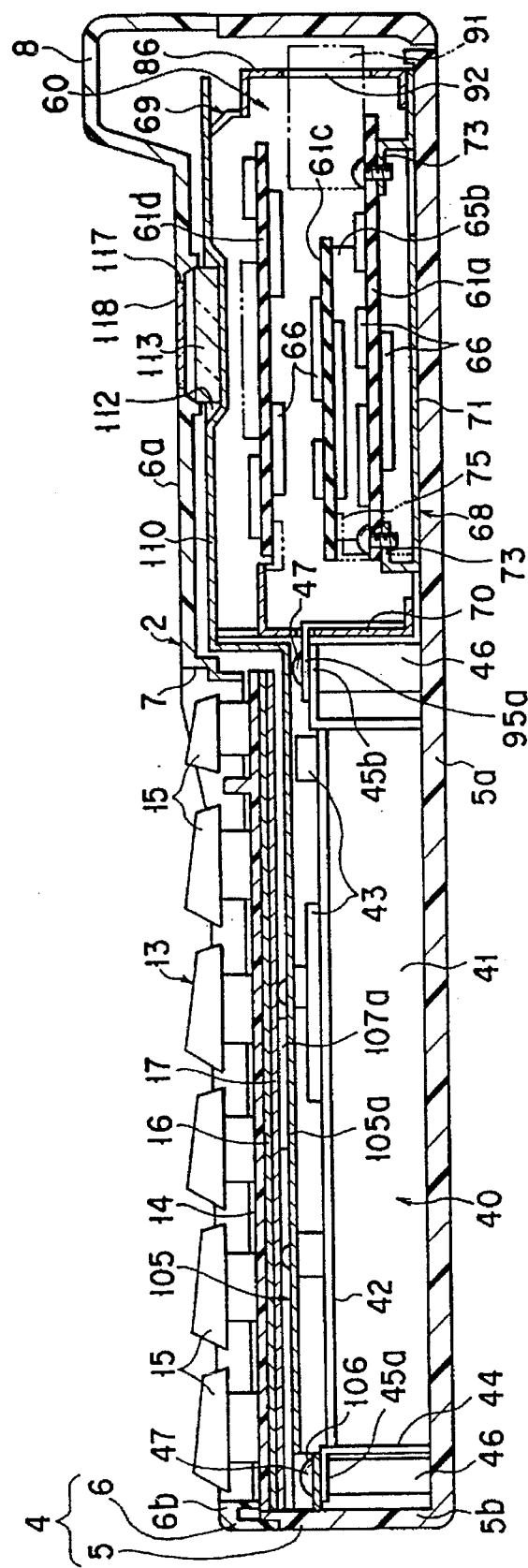

As illustrated in FIG. 4, the bottom case 5 has a flat bottom wall 5a and a peripheral wall 5b extending from the bottom wall 5a. The top cover 6 has a substantially flat top wall 6a and a peripheral wall 6b extending from the top wall 6a. The outer surface of the peripheral wall 6b of the top cover 6 is coplanarly aligned with that of the peripheral wall 5b of the bottom case 5 and the peripheral walls 5b and 6b jointly define the front, side and rear ends of the housing 4.

Figure 2:
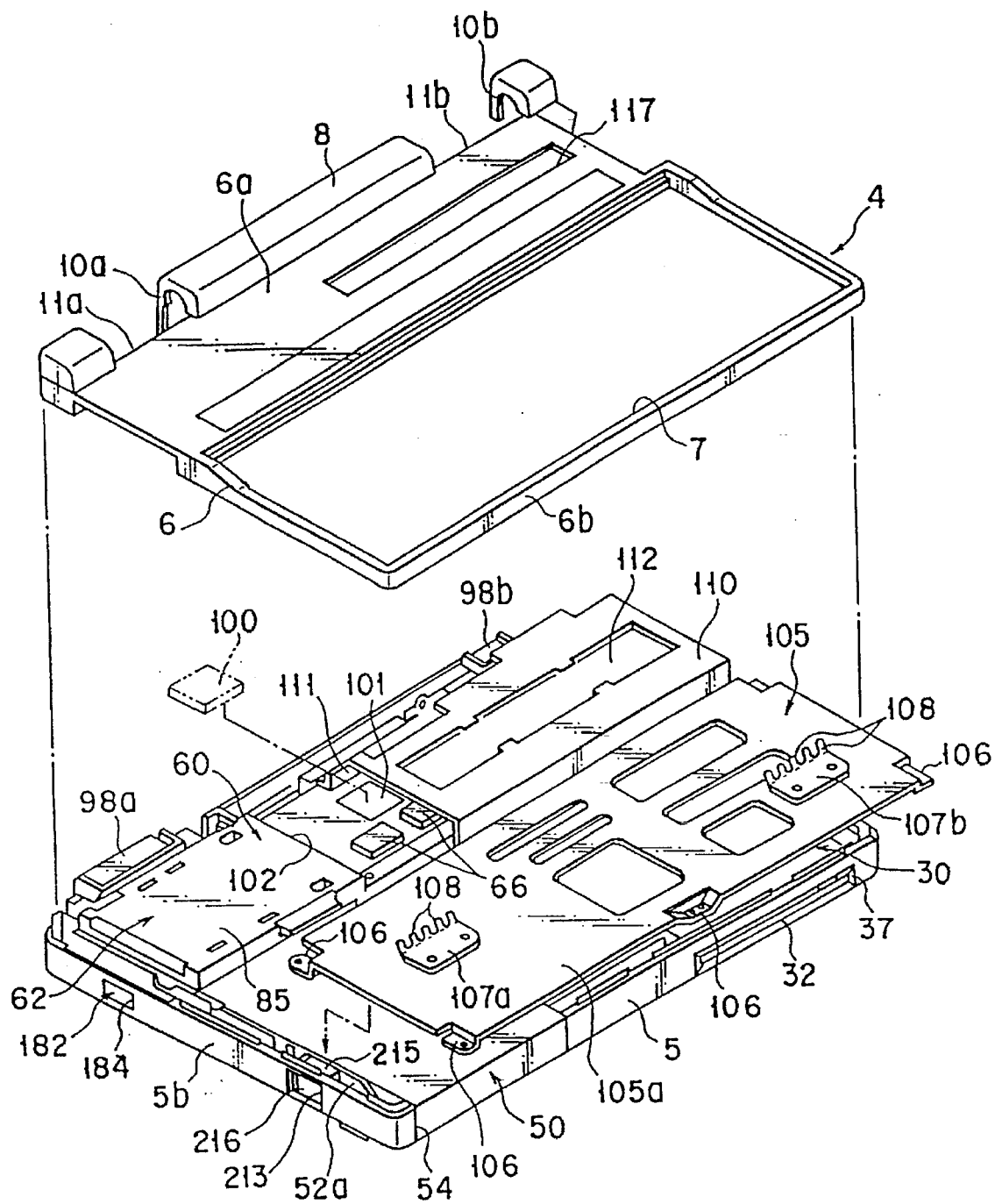

As shown in FIGS. 2 and 4, the top cover 6 is provided on its top wall 6a with a large opening that serves as a keyboard outlet 7, which substantially occupies the entire area of the front half of the top wall 6a. The top wall 6a has a projecting portion 8 arranged at its rear end. The projecting portion 8 extends between the opposite sides of the top cover 6 and has on its underside and near the opposite ends a pair of grooves serving as stem bearing portions 10a, 10b and a pair of cut off areas 11a, 11b arranged adjacent to the respective stem bearing portions 10a, 10b.

As seen from FIGS. 1 and 4, a keyboard unit 13 is disposed in the front half area of the housing 4. The keyboard unit 13 has a keyboard body 14 formed of synthetic resin and having a rectangular plate shape adapted to fit in the keyboard outlet 7. The keyboard body 14 has a flat upper surface and a flat lower surface and a number of keys 15 are arranged on the upper surface. An aluminum reinforcement plate 17 is laid under the lower surface of the keyboard body 14 with a film 16 inserted therebetween. On the film 16 is printed a circuit pattern in order to transmit switching signals generated by depressing keys. The reinforcement plate 17 is rectangular and has a length and a width which is the same as those of the keyboard body 14. The reinforcement plate 17 serves to increase the strength of the keyboard body 14 and, at the same time, prevent switching noises generated by key operations from leaking outside the housing 4.

The keys 15 of the keyboard unit 13 are exposed through the keyboard outlet 7 of the housing 4, and the reinforcement plate 17 faces inside the housing 4.

Figure 6:
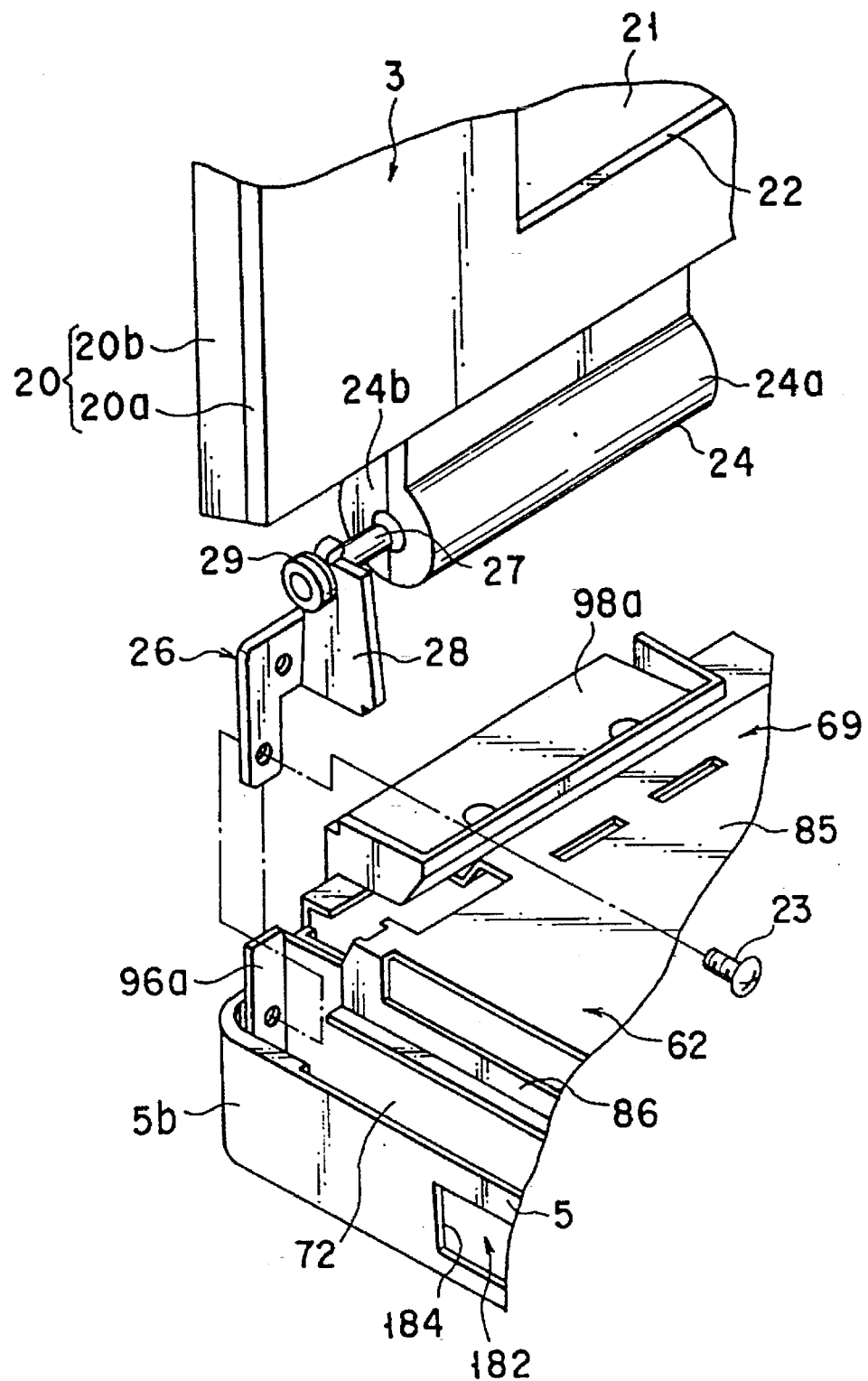

As seen from FIGS. 1 and 6, the display unit 3 comprises a thin box-shaped housing 20 and a liquid crystal display 21. The housing 20 is divided into a front panel 20a and a rear panel 20b. The front panel 20a is provided with a display opening 22, through which the liquid crystal display 21 is exposed. The housing 20 is provided at its opposite sides with a pair of horizontal stems 24, 25 projecting therefrom. As shown in FIG. 6, the stem 24 is formed by combining a front stem half 24a integrally formed with the front panel 20a and a rear stem half 24b integrally formed with the rear panel 20b. The other stem 25 is also configured in a similar manner. The stems 24 and 25 are received by the respective stem bearing portions 10a and 10b and connected to the bottom case 5 of the housing 4 via respective hinges 26.

Each of the hinges 26 comprises a hinge shaft 27 projecting sideways from the stems 24 or 25. As shown in FIG. 6, the hinge shaft 27 of the hinge 26 for the stem 24 is rigidly held at an end by a bracket (not shown) buried in the stem 24 and connected at the opposite end to another bracket 28, which is rotatable around the axis of the hinge shaft 27, with a wave washer 29 interposed therebetween. The wave washer 29 gives rise to frictional resistance between the bracket 28 and the hinge shaft 27 to inhibit free rotation of the hinge shaft 27, and the bracket 28 is inserted into the bottom case 5 from above and rigidly secured to it. The above description also applies to the hinge shaft 27 for the stem 25.

Figure 5:
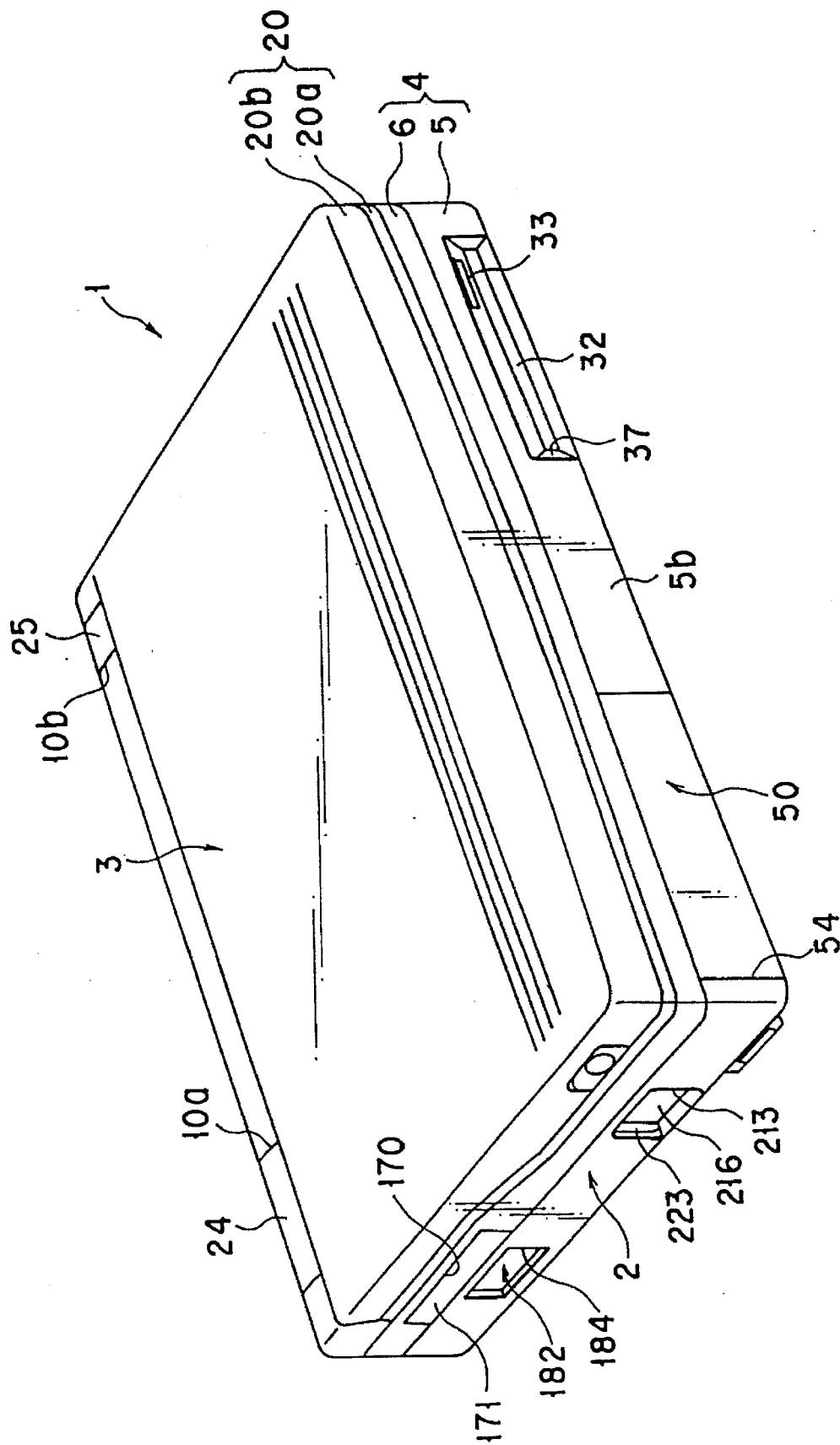

Thus, the hinge shafts 27 provide pivots for rotary movement of the display unit 3 so that it may be rotatable to take a first position where it covers the keyboard unit 13, a second position where it stands up behind the keyboard unit 13 to expose the liquid crystal display 21 and a third position where the liquid crystal display 21 is found almost lying flat and opposite to the keyboard unit 13 with respect to the hinge shafts 27. In the first position as illustrated in FIG. 5, the outer surface of the housing 20 of the display unit 3 is coplanarly aligned with that of the housing 4 including the projecting portion 8 to make the computer 1 appear like a flat book that can be conveniently carried by hand.

When the display unit 3 is brought to its third position 3, the top cover 6 becomes removable from the top of the bottom case 5. Under this condition, the hinges 26 are concealed by the projecting portion 8 of the top cover 6 and, if seen from outside, the stems 24, 25 appear to be located in the respective stem bearings 10a, 10b.

Figure 3:
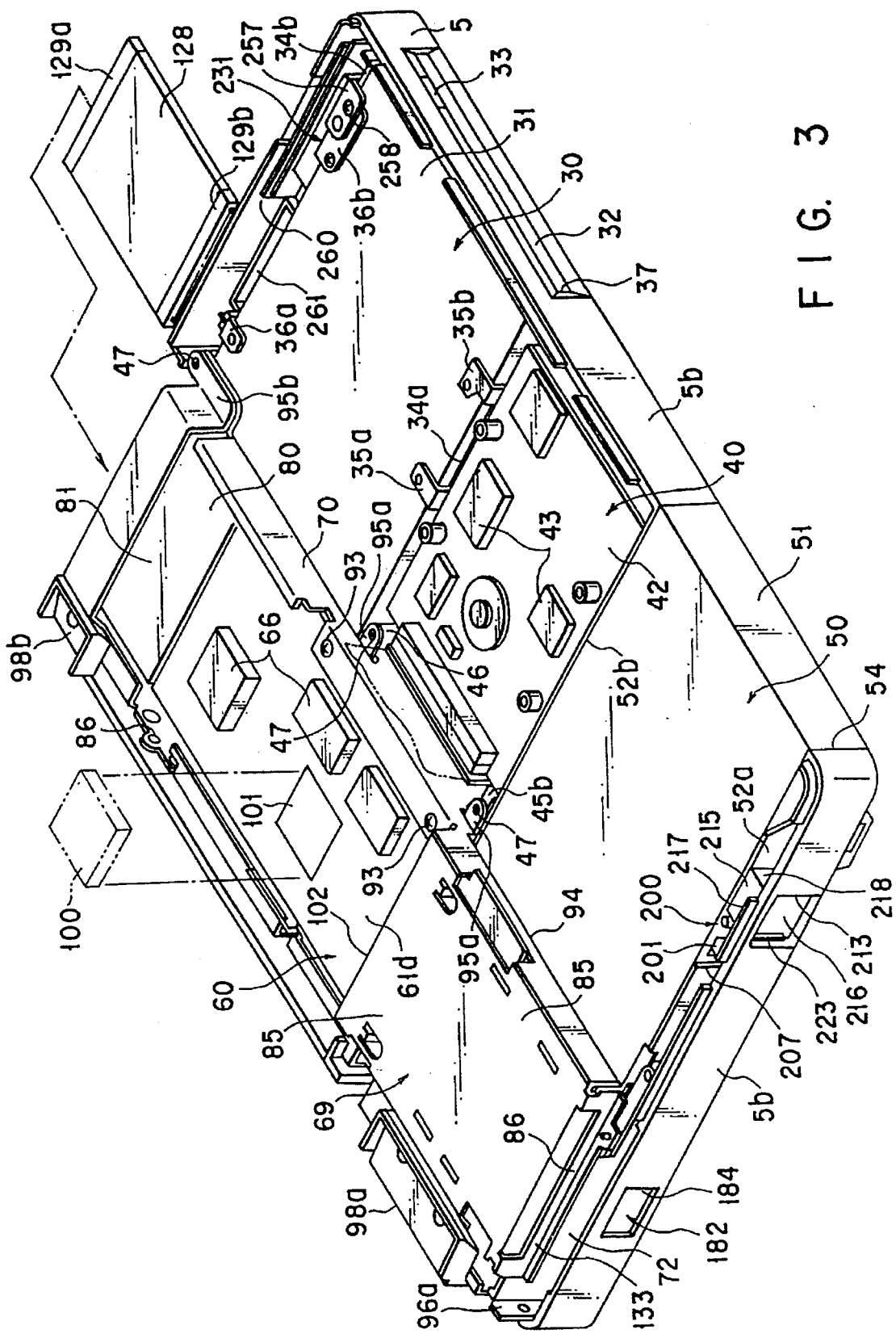

As indicated in FIG. 3, a floppy disc drive (hereinafter referred to as FDD) 30, a hard disc drive (hereinafter referred to as HDD) 40 and a battery pack 50 are arranged in the above mentioned order from right to left in the front half of the bottom case 5 as so may functional components. Each of the FDD 30, the HDD 40 and the battery pack 50 is of modular design and located below the keyboard unit 13.

The FDD 30 comes in a metal casing 31, which is provided on its front end with an aperture 32 through which a floppy disc can be inserted into and ejected from the casing 31 and a push button 33 that triggers ejection of a floppy disc when it is depressed. The casing 31 is also provided on its side ends with respective metal brackets 34a, 34b having respective lugs 35a, 35b, 36a, 36b extending upward from the top of the casing 31.

The FDD 30 is disposed on the bottom wall 5a with the aperture 32 and the push button 33 facing the front end of the bottom case 5 and exposed to the outside through an access opening 37 cut through the front wall of the bottom case 5 near its right side end.

As shown in FIGS. 3 and 4, the HDD 40 also comes in a metal housing 41 that contains magnetic discs and heads hermetically sealed therein. A circuit board 42 is arranged on the top of the housing 41 and various circuit components are mounted on the circuit board 42 to form a control circuit and a drive circuit for the HDD 40. The housing 41 is arranged on the bottom wall 5a side by side with the FDD 30 and carries on its lateral wall a metal bracket 44, which by turn comprises a pair of fixtures 45a, 45b that are rigidly secured to respective upright bosses 47, 47 projecting from the bottom wall 5a by means of screws 46, 46.

Figure 7:
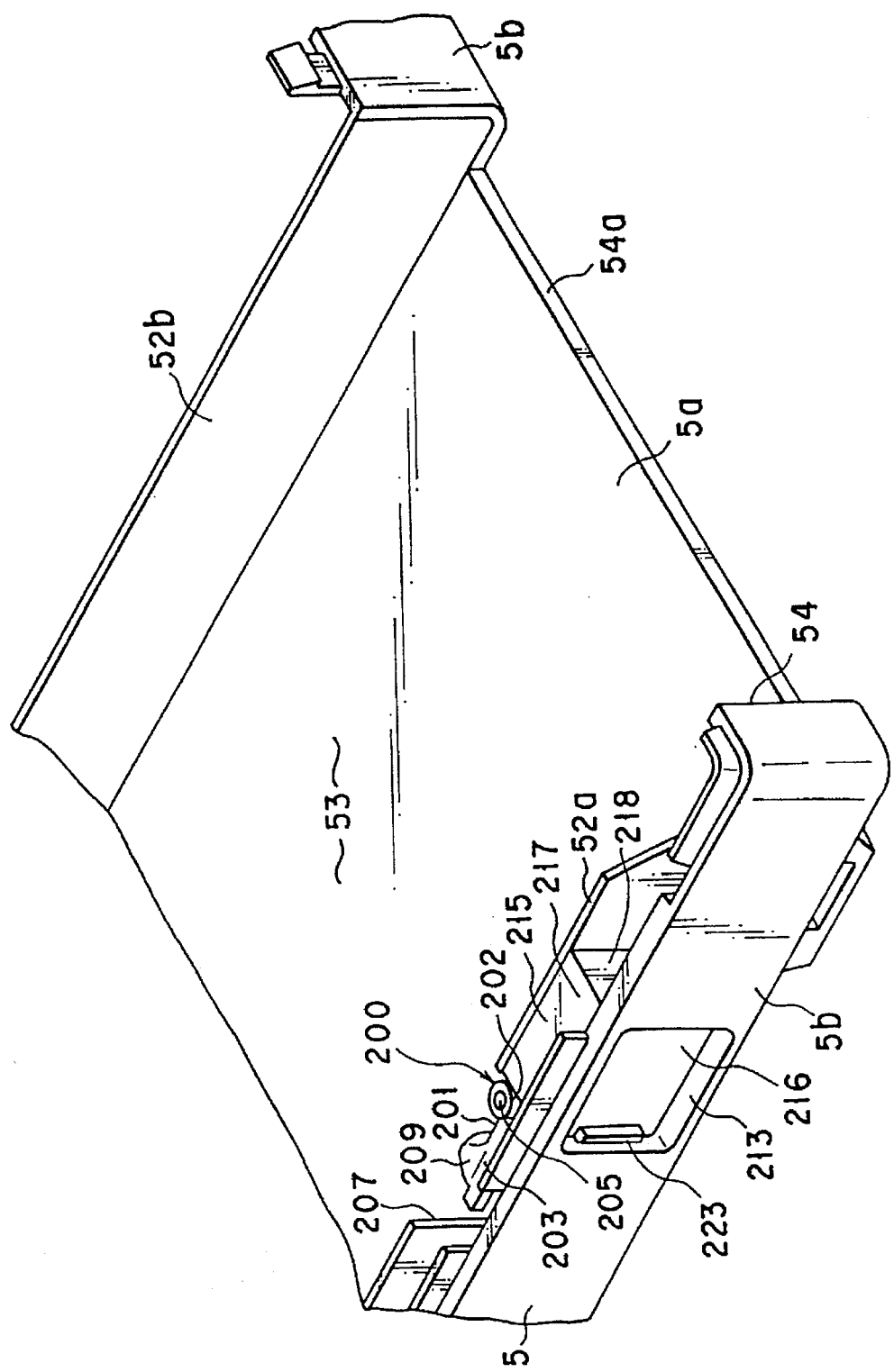

The battery pack 50 is rechargeable and serves as power source when the computer 1 is used without any commercial power supply. The battery pack 50 has a flat and rectangular synthetic resin case 51, which contains therein a plurality of rechargeable batteries and is arranged on the bottom wall 5a of the bottom case 5. As shown in FIGS. 3 and 7, the bottom wall 5a of the bottom case 5 carries thereon a pair of guide walls 52a, 52a standing there to guide the sides of the case 51 and defining a battery storage section 53 within the bottom case 5. The battery storage section 53 is located to the left of the bottom case 5 and is accessible through a battery insertion opening 54 cut through the front wall of the bottom case 5 near its left side end. Thus, a battery pack 50 may be inserted into and ejected from the battery storage section 53 through the insertion opening on the front side of the housing 4.

As illustrated in FIG. 7, the battery access opening 54 includes a bottom opening 54a cut through the bottom wall 5a of the bottom case 5. The front edge of the bottom wall 5a defining the rear end of the bottom opening 54a is found behind the front wall of the bottom case 5. As shown in FIG. 8A, the case 51 of the battery pack 50 has a downward ridge 55 extending along the front end and between the opposite side ends of the case 51. The downward ridge 55 makes part of the bottom wall 5a of the bottom case 5 when the battery pack 50 is inserted into the battery storage section 53 and serves as a hook for receiving a finger tip when the battery pack 50 is pulled out of the battery storage section 53.

As illustrated in FIGS. 8A and 8B, the battery storage section 53 is provided along its rear end with a pair of upwardly projecting stoppers 56a, 56b. As a battery pack 50 is inserted into the battery storage section 53, its front end eventually abuts the stoppers 56a, 56b so that the battery pack 50 is held in position within the battery storage section 53. On the other hand, the case 51 is provided along its front end with positive and negative power supply terminals 57a, 57b connected to the batteries housed in the case 51 and a pair of connector terminals 58a, 58b connected to a safety fuse and a temperature sensor (not shown).

Figure 9:
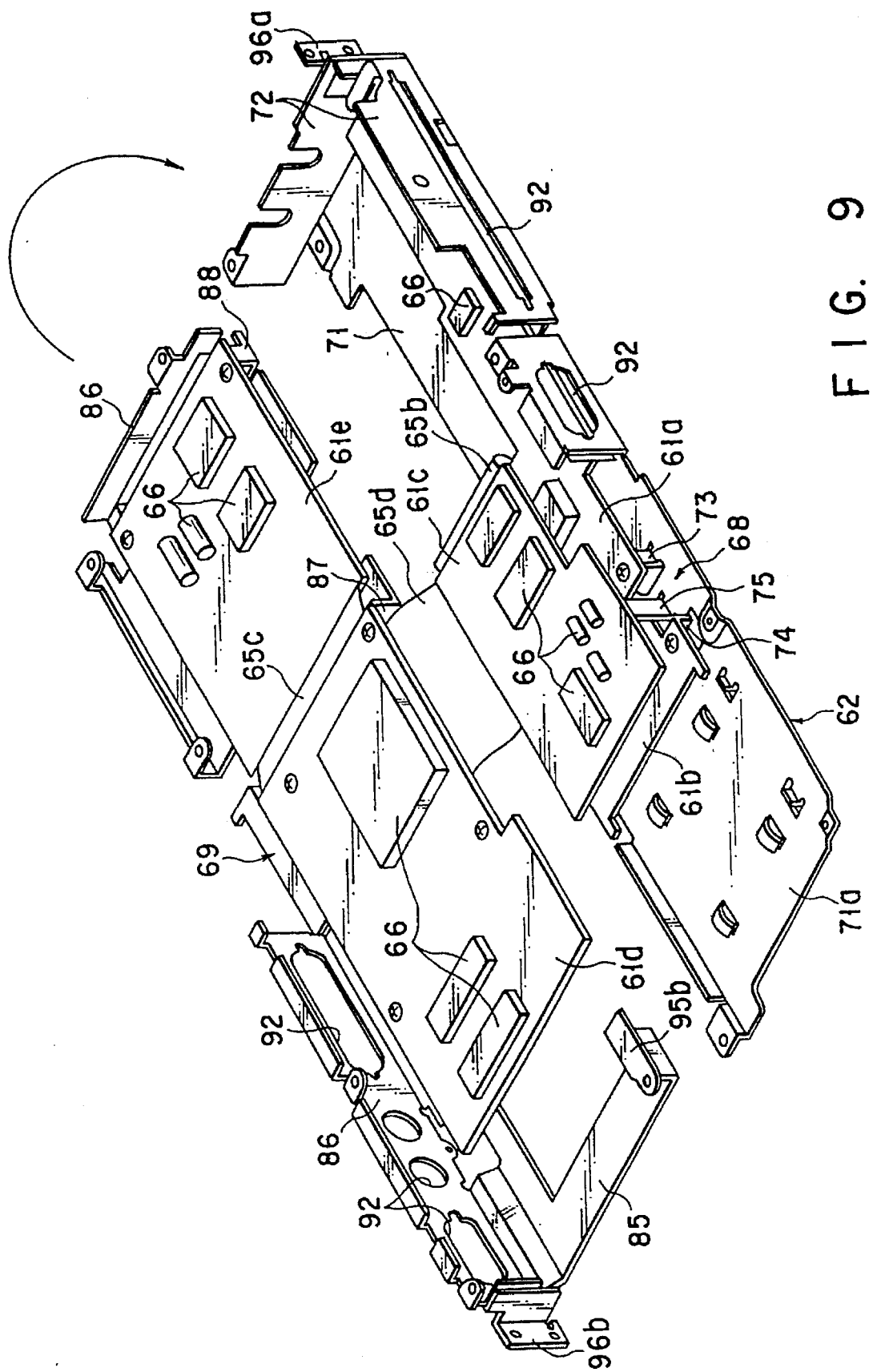
Figure 11:
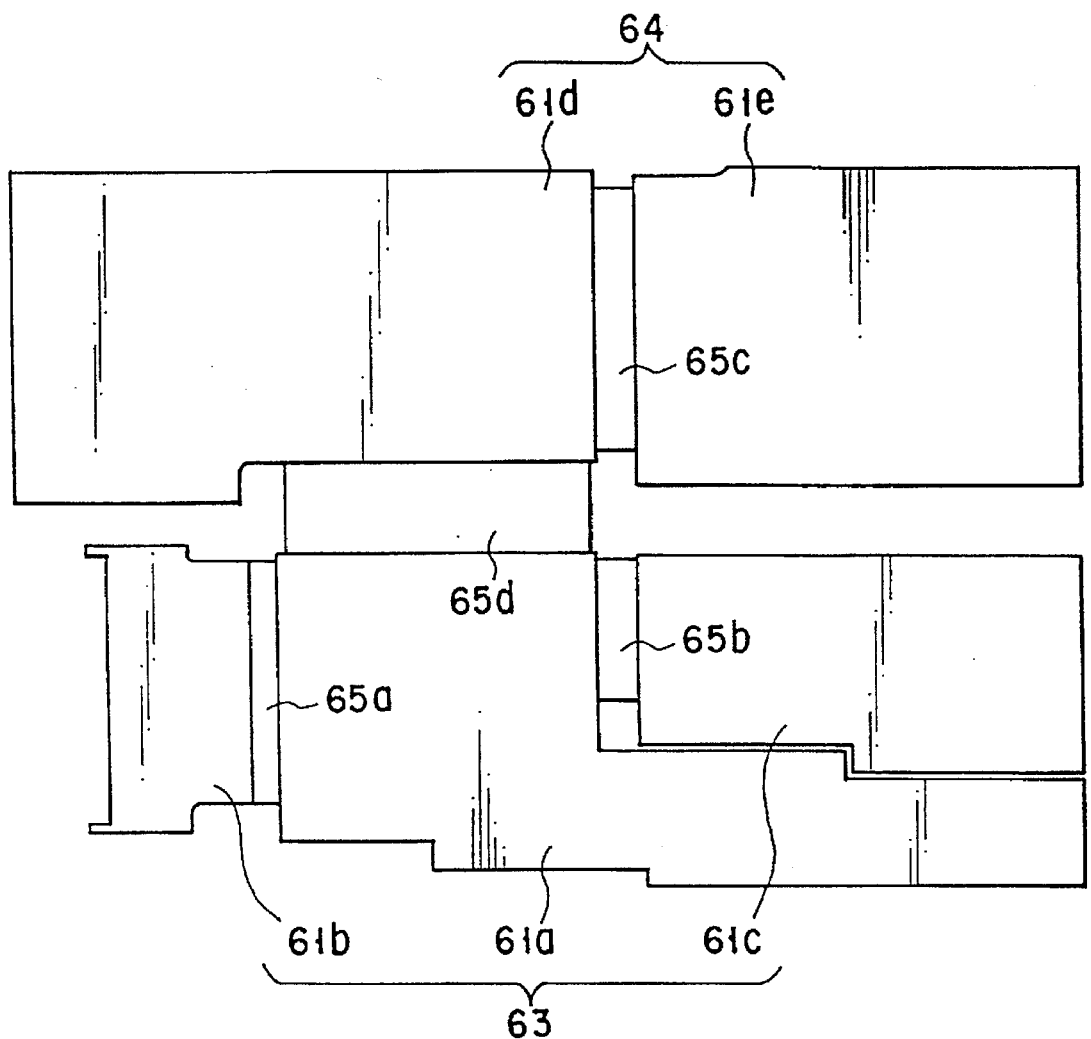

As shown in FIG. 3, a board unit 60 that operates as one of the functional components is housed in the rear half of the bottom case 5 and is located behind the FDD 30, the HDD 40 and the battery pack 50 such that it extends all the way between the opposite side ends of the bottom case 5. The board unit 60 of the embodiment comprises, as shown in FIGS. 9 and 11, first through fifth circuit boards 61a through 61e and a shield frame 62 holding and surrounding the circuit boards 61a through 61e arranged in mutually separated three layers laid along the height of the housing 4.

The circuit boards 61a through 61e are prepared by cutting a single rigid board base and have appropriate respective dimensions. Each of the boards carries on its upper and lower surfaces given circuit patterns (not shown) formed by printing. As shown in FIG. 11, the circuit boards 61a through 61e are divided into two groups. The first through third circuit boards 61a through 61c are arranged on a side by side basis along the transversal direction of the bottom case 5 to form a first board group 63, while the fourth and fifth circuit boards 61d and 61e are arranged in a similar manner to form a second board group 64. The first circuit board 61a and the second circuit board 61b are electrically connected with each other via a first flexible connecting board 65a, whereas the first circuit board 61a and the third circuit boards 61c are electrically connected with each other via a second flexible connecting board 65b. Similarly, the fourth circuit board 61d and the fifth circuit board 61e are electrically connected with each other via a third flexible connecting board 65c, whereas the first circuit board 61 and the fourth circuit board 61d are electrically connected with each other via a fourth flexible connecting board 65d. Thus, while the circuit boards 61a through 61e are separated from one another, they are electrically mutually connected.

The circuit boards 61a through 61e carry on their upper and lower surfaces a number of circuit components 66, which are connected to the respective circuit patterns. The circuit components 66 include those that generate and emit high frequency noises as well as heat. Particularly, since the third circuit board 61c in this embodiment constitutes a power supply board, most of the circuit components arranged on it can generate heat at a considerable rate.

The shield frame 62 comprises a first shield plate 68, a second shield plate 69 and a connector board 70 disposed between the shield plates 68 and 69. Each of the shield plates 68 and 69 and the connector board 70 is made of a metal plate having an electromagnetic shield effect.

Figure 10:
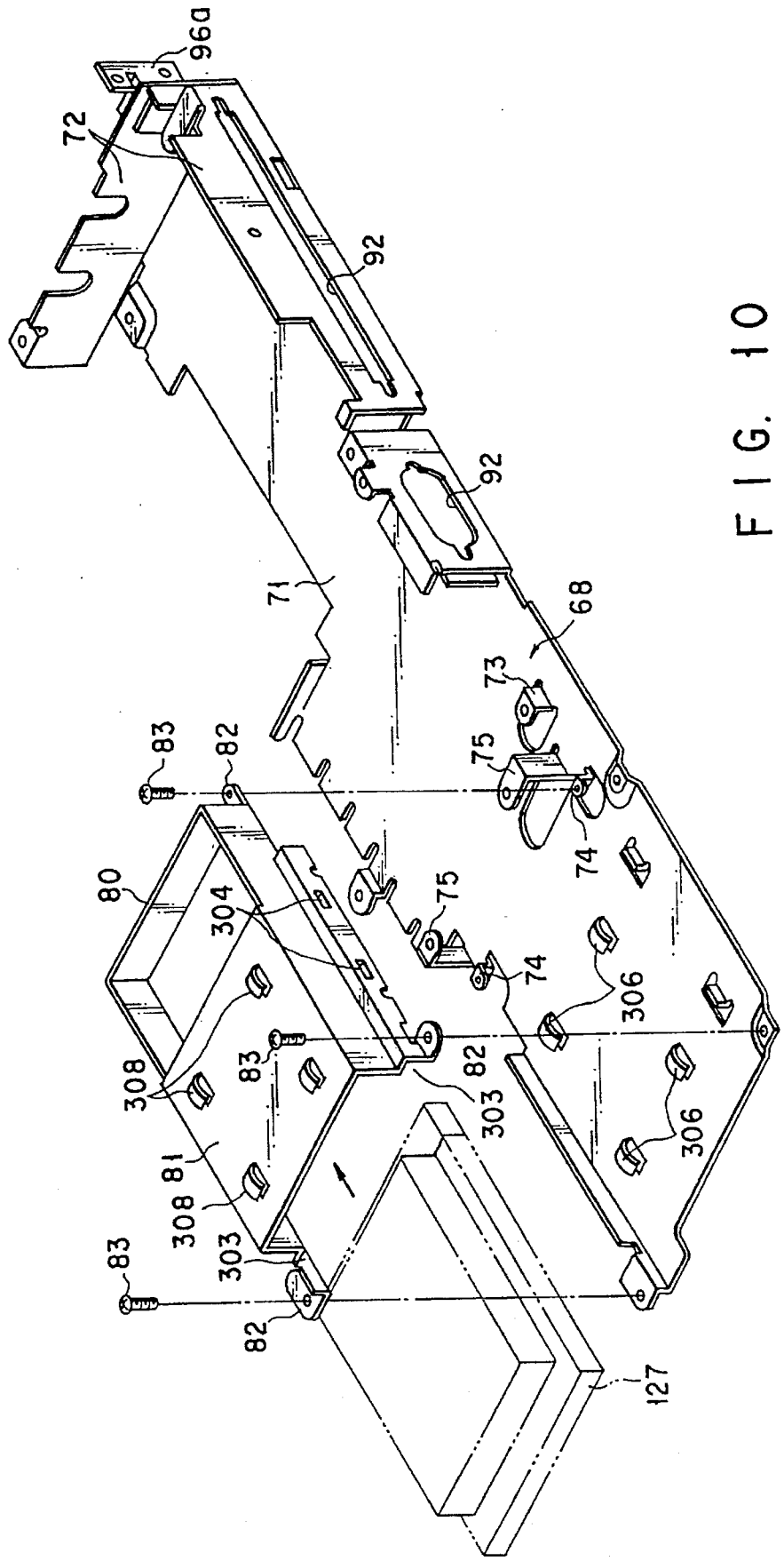

As illustrated in FIGS. 4, 9 and 10, the first shield plate 68 comprises as integral parts thereof an oblong base plate section 71 to be directly placed on the bottom wall 5a of the bottom case 5 and an upright section 72 standing from some of the edges of the base plate section 71. The base plate section 71 is provided with first support portions 73 for supporting the first circuit board 61a, second support portions 74 for supporting the second circuit board 61b and third support portions 75 for supporting the third circuit board 61c. These support portions 73, 74 and 75 are formed by partly cutting the base plate section 71 to produce curved slits and bending the cut areas upward along the lines connecting the opposite ends of the respective slits. The first and second support portions 73 and 74 have a substantially equal height, whereas the third support portion 75 is higher than the other two support portions 73 and 74.

The first and second circuit boards 61a and 61b are supported respectively by the front ends of the first and second support portions 73 and 74 and secured thereto by means of screws. Note that the base plate section 71 covers the undersides of the first and second circuit boards 61a and 61h and some of the circuit components 66 are arranged between the base plate section 71 and the circuit board 61a or 61b. As seen from FIG. 9, the second connecting board 65b connecting the first circuit board 61a and the third circuit board 61c is bent to show a turned U-shaped cross section so that the third circuit board 61c may be located above the first and second circuit boards 61a and 61b. Moreover, the third circuit board 61c is supported by the front end of the third support portions 75 and secured thereto by means of a screw at an end opposite to the end where it is connected to the connector board 65b. Thus, it may be understood that the three circuit boards 61a through 61c are arranged on the first shield plate 68 in two layers.

The base plate section 71 of the first shield plate 68 has a right side extension 71a extending from the side of the base plate section 71 located opposing to the second circuit board 61b. The extension 70a is found behind the FDD 30 and covered by a metal plate cover 80 as illustrated in FIG. 10. The cover 80 comprises a partition 81 disposed above the extension 71a and lugs 82 arranged on the four corners of the cover 80. The lugs 82 are respectively placed on the corners of the extension 71a and the front ends of the second support portions 74 and secured thereto by means of screws 83.

As shown in FIGS. 3 and 9, the second shield plate 69 comprises as integral parts thereof an oblong base plate section 85 transversally extending on the housing 4 and an upright section 86 standing from an edge of the base plate section 85. The base plate section 85 is provided with first support portions 87 for supporting the fourth circuit board 61d and second support portions 88 for supporting the fifth circuit board 61e. The fourth circuit board 61d and the fifth circuit board 61e are respectively secured to the front ends of the first support portions 87 and the front ends of the second support portions 88 by means of screws.

When, as illustrated in FIG. 9, the circuit boards 61a through 61e are respectively secured to the first and second shield plates 68 and 69, the shield plates 68 and 69 are connected to each other via the fourth connecting board 65d. Then, the shield plates 68 and 69 are put together on a one on the other basis, i.e., superposed with each other, the fourth connecting board 65d being bent to show a turned U-shaped cross section. Under this condition, the shield plates 68 and 69 are rigidly secure to each other by means of screws (not shown). Now, the base plate section 71 of the shield plate 68 and the base plate section 85 of the shield plate 69 are oppositely located and the circuit boards 61d and 61d secured to the base plate section 85 are located above the circuit boards 61a through 61c arranged on the base plate section 71. Thus, the circuit boards 61a through 61e are arranged in three layers in the housing 4. Note that, in this embodiment, the third circuit board 61c dedicated to power supply and hence apt to emit heat at an enhanced rate is disposed between the first circuit board 61a and the fourth circuit board 61d.

When the shield plates 68 and 69 are put together on a one on the other basis, the upright sections 72 and 86 are arranged side by side to provide the left side wall and the rear wall of the shield frame 62. The upright sections 72 and 86 are provided with a plurality of connector access apertures 92 that allows lead wires of various connectors to pass therethrough.

As shown in FIGS. 3 and 4, the connecting board 70 is disposed between front end of the base plate section 71 and that of the base plate section 85 and secured to the base plate sections 71 and 85 by means of screws. The connecting board 70 provides the front wall of the shield frame 62 and the fourth circuit board 61d is partly supported on the top of the connecting board 70. Near the left side end of the connecting board 70, there is formed a slot 94 through which the front end of the battery pack 50 is introduced. The battery pack 50 is held under an area of the base plate section 85 located above the slot 94.

The board unit 60 comprising the circuit boards 61a through 61e and the shield frame 62 is loaded on the bottom wall 5a of the bottom case 5. Then, as shown in FIGS. 3 and 4, lugs 95a extending from the connecting board 70 and a lug 95b arranged at the front right corner of the second shield plate 69 are fitted to respective bosses 46 erected on the bottom wall 5a of the bottom case 5 by means of screws. Note that the lug 95b is secured to the corresponding boss 46 as it is placed on the case 31 of the FDD 30, whereas the lugs 95a are respectively secured to the bosses 46 with anchoring members 46b of the HDD 40.

As seen from FIGS. 6 and 9, anchoring members 96a and 96b are formed at the respective ends of the upright sections 72 and 86 that provide a rear wall for the shield frame 62 and the brackets 28 of the hinges 26 are respectively secured to the anchoring members 96a and 96b by means of screws. Thus, the shield frame 62 is designed to support the display unit 3 too.

As shown in FIGS. 2 and 3, a pair of synthetic resin covers 98a, 98b are secured to respective rear end areas of the upper surface of the shield frame 62. These covers 98a, 98b are so designed as to conceal the openings of the stem bearing portions 10a, 10b from underneath when the top cover 6 is fitted onto the bottom case 5 and provide bottoms for the respective stem bearing portions 10a, 10b.

As shown in FIG. 3, of the circuit boards 61a through 61e arranged in three layers, the fourth circuit board 61d located on the top layer is provided with a spare zone 101 for receiving thereon one or more than one additional circuit components 100 such as a keyboard controller to be installed in order to upgrade the portable computer. The spare zone 101 is located at the middle of the board unit 60 in the longitudinal direction of the unit 60 and will be filled with circuit patterns. The base plate section 85 of the second shield plate 69 that covers the fourth circuit board 61d from above is provided with a cut out area 102 at a position facing at least the spare zone 101 and most of the upper surface of the fourth circuit board 61d including the spare zone 101 is upwardly exposed through the cut out area 102.

On the other hand, the upper surfaces of the FDD 30, the HDD 40 and the battery pack 50 are covered by a metal shield plate 105 that also operates as a fixture plate. The shield plate 105 comprises, as illustrated in FIGS. 2 through 4 and 12, a flat and rectangular main section 105a realized in a form that corresponds to the plan view of the front half of the bottom case 5. The main section 105a is provided along its edges with a plurality of lugs 106. The shield plate 105 is then secured to the lugs 35a, 35b, 36a, 36b, while the lugs 106 are secured by screws 47 to the corresponding bosses 46 on the bottom wall 5a of the bottom case 5. Of the lugs 106, those arranged at the rear corners of the main section 105a are laid on the respective lugs 95a, 95b of the shield frame 62 on the bosses 46 so that the shield frame 62 and the shield plate 105 are electrically connected with each other.

Thus, once the lugs 106 of the shield plate 105 are secured to the bosses 46 by screws, the FDD 30, the HDD 40 and the battery pack 50 are clamped by the shield plate 105 and the bottom wall 5a and consequently firmly fixed to the bottom case 5.

As shown in FIG. 4, the main section 105a of the shield plate 105 is located below the keyboard unit 13, and the reinforcement plate 17 of the keyboard unit 13 is located opposing to the shield plate 105 with a narrow clearance therebetween. A pair of metal plate springs 107a and 107b are arranged near the respective side edges and on the upper surface of the shield plate 105. Each of the plate springs 107, 107b are equipped with a plurality of resiliently deformable contact pieces 108, which are held in contact with the reinforcement plate 17 of the keyboard unit 13 so that the shield plate 105 and the reinforcement plate 17 are electrically connected with each other.

Figure 12:
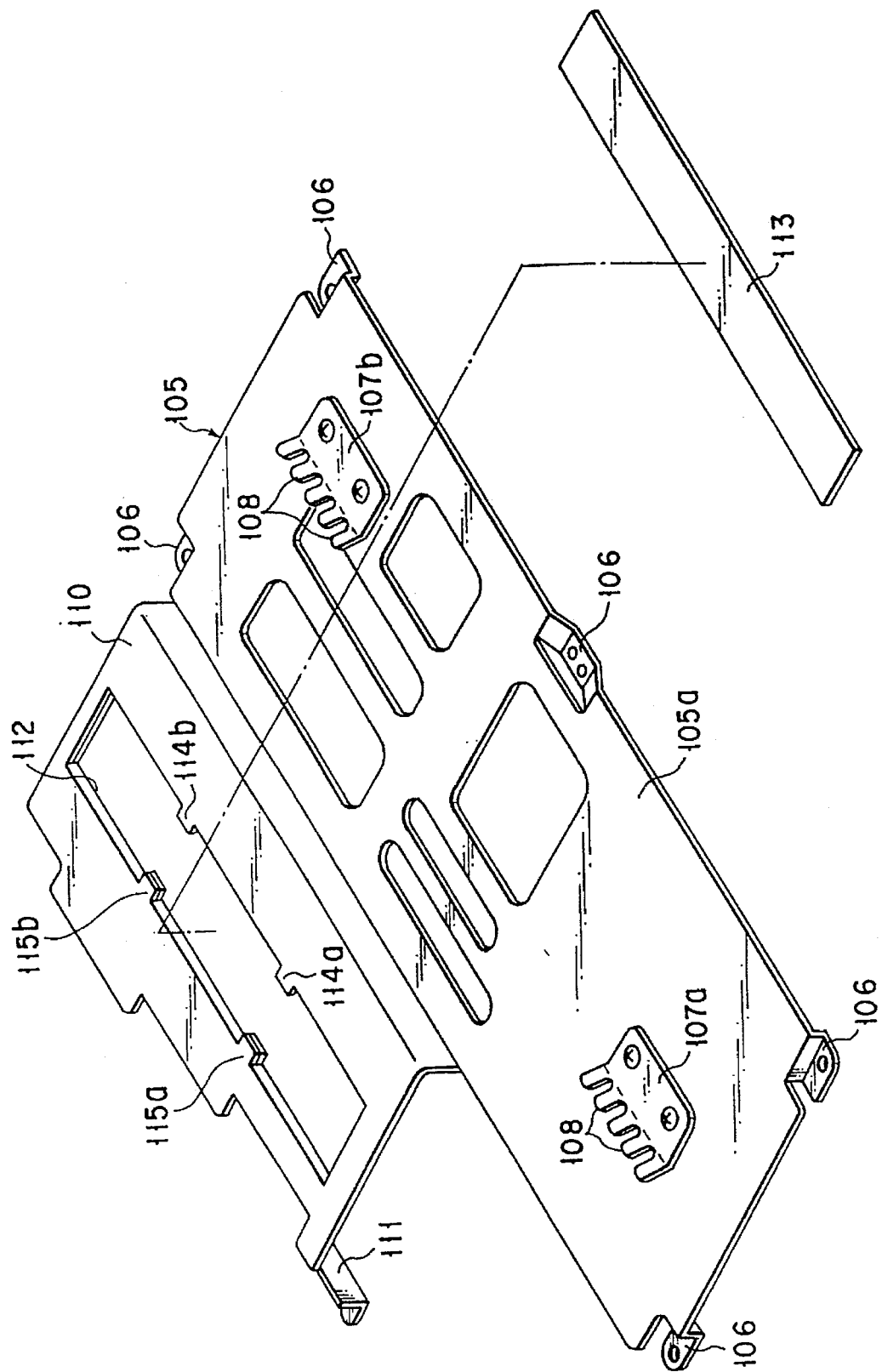

As illustrated in FIG. 12, the shield plate 105 has as integral part thereof an extension 110 extending from the rear end of the main section 105a toward the board unit 60. The extension 110 has a shape corresponding to that of the cut out area 102 and covers the cut out area 102 and the fourth circuit board 61d that carries thereon the spare zone 101. The extension 110 has at its front end a connecting portion 111 as integral part thereof, and the connecting portion 111 is secured to the rear end of the shield frame 62 by means of screws. Thus, the extension 110 may not lift unintentionally, and the board unit 60 is held between the extension 110 and the bottom wall 5a of the bottom case 5.

As seen from FIGS. 4 and 12, the extension 110 is located close to the rear half of the top wall 6a of the top cover 6 and has a transversely extending recess 112 for receiving a reflection type liquid crystal display 113, which is designed to display various operating conditions of the computer 1. The liquid crystal display 113 has an oblong rectangular plan view. While it is held immovable relative to the recess 112 in the transverse direction of the housing 4, its position is adjustable forwardly or rearwardly within a given limit.

Figure 13:
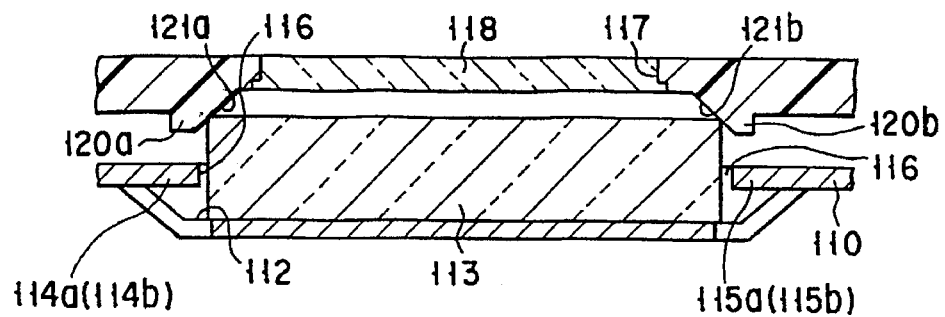

More specifically, the recess 112 has a width slightly greater than that of the liquid crystal display, and oppositely arranged pairs of engaging members 114a, 114b and 115a, 115b are projecting toward the corresponding ones from the front and rear edges of the recess. As shown in FIG. 13 in enlarged dimensions, the front and rear sides of the liquid crystal display 113 are separated from the respective engaging members 114a, 114b and 115a, 115b by narrow clearances 116 so that the liquid crystal display 113 may be shifted forwardly or backwardly within the limit. The top surface of the liquid crystal display 113 is found above the upper surface of the extension 110.

An oblong display window 117 is formed through the rear half of the top wall 6a of the top cover 6 to expose the liquid crystal display 113. A transparent protective cover 118 is fitted to the display window 117. The top wall 6a has as integral part thereof on its inner surface with downwardly projecting ridges 120a and 120b extending respectively along the front and rear edges of the display window 117. As shown in FIG. 13, the ridges 120a and 120b are respectively located right above the upper front edge and the upper rear edge of the liquid crystal display 113 and oppositely chamfered to produce guide bevels 121a and 121b that provide a greater distance therebetween toward the ridgelines.

The guide bevels 121a and 121b are so arranged that they respectively abut the upper front edge and the upper rear edge of the liquid crystal display 113 when the top cover 6 is properly put on the bottom case 5. As a result of the abutment, the liquid crystal display 113 is moved forward or rearward as a function of the inclination of the guide bevels 121a and 121b to offset any clearances between the display window 117 of the top cover 6 and the liquid crystal display 113. At the same time, the liquid crystal display 113 is pressed against the bottom of the recess 112 so that the display 113 may not be allowed to accidentally tilt in any directions.

Figure 14:
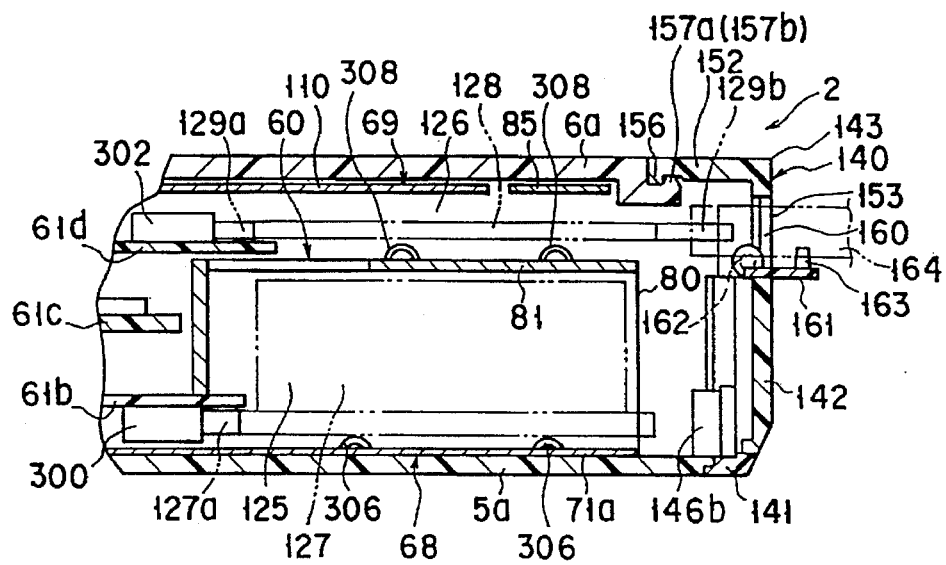

As illustrated in FIG. 14, the board unit 60 is provided at its right side with first and second card slots (card storage spaces) 125 and 126 for receiving function expansion cards. The card slots 125 and 126 are arranged on a one above the other basis. The lower first card slot 125 is formed between the extension 71a of the first shield plate 68 and the partition 81 of the cover 80 to dimensions typically capable of storing any card conforming to the applicable PCMICA standard including those for thick type cards that may have a maximum thickness of 18.0 mm. This first card slot 125 is designed to typically receive a card, such as an expansion card 127, which may be constantly used and is held in the slot without being frequently drawn out the slot. As may be understood from FIGS. 9 and 14, the second circuit board 61b is located near an end of the first card slot 125 and a connector 300 conforming to the PCMCIA standard is arranged on the second circuit board 61b. The connector 300 is designed to be connected to a terminal section 127a of the expansion card 127, whereas the terminals of the connector 300 are connected to the circuit pattern formed on the circuit board 61b.

On the other hand, the second card slot 126 is formed between the partition 81 of the cover 80 and the base plate section 85 of the second shield plate 69 and extension 110 of the shield plate 105 disposed adjacent to the base plate section 85. The second card slot 126 is formed to dimensions appropriate to receive a card of type 1 with a thickness of 3.3 mm or of type 2 with a thickness of 5.0 mm, e.g., an interface card 128, which may be frequently inserted and drawn out the card slot 126. As shown in FIG. 3, the interface card 128 normally has terminal sections 129a and 129b arranged at opposite ends thereof and a thickness smaller than that of the expansion card 127. As may be seen from FIG. 3, the fifth circuit board 61e is located close to an end of the second card slot 126, and a connector 302 conforming to the applicable PCMCIA standard is arranged on the fifth circuit board 61e. The connector 302 is designed to be connected to the terminal section 129a of the interface card 128, whereas the terminals of the connector 302 are connected to the circuit pattern formed on the circuit board 61e.

As shown in FIG. 10, side walls of the cover 80 defining the first card slot 125 have respective outwardly projecting lower end portions that define a pair of guide grooves 303 for guiding the side edges of the card 127. Each of the lower end portions of the cover 80 is provided with a pair of projections 304 formed by pressing parts of the lower end portions. These projections 304 project into the respective guide grooves 303 and abut the respective side edges of the card inserted into the first card slot 125 to hold the card in position. A total of four projections 306 are formed on the extension 71a of the first shield plate 68 in a manner as described above with regard to the projections 304. The projections 306 are designed to abut the lower surface of the card inserted into the first card slot 125 to hold the card in position.

The partition 81 of the cover 80 that defines the second card slot 126 is provided with four projections 308 that are designed to abut the lower surface of the card inserted into the second card slot 126 to hold the card in position. Additionally, a pair of guides (not shown) are arranged in the second card slot 126 to guide the side edges of the card.

Figure 15:
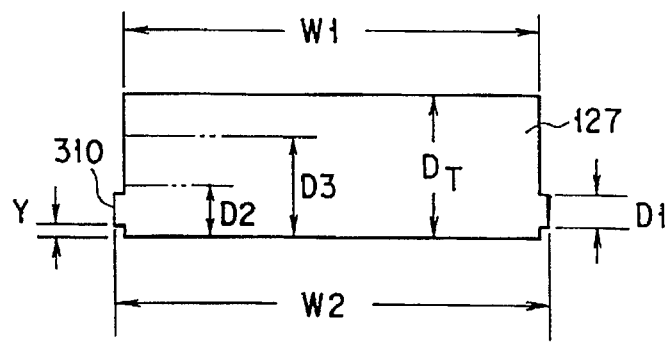

The first card slot 125 and the second card slot 126 have identical widths. In other words, the distance between the guide grooves 303 for the first card slot 125 and the distance between the guides for the second card slot 126 are equal to each other. The card slots 125 and 126 differs from each other only in terms of height. FIG. 15 illustrates cards conforming to the PCMCIA standard and usable in either the first card slot 125 or the second card slot 126. More specifically, a thick type card 127 as illustrated in FIGS. 10 and 15 is substantially rectangularly parallelepipedic and provided with guide ribs 310 projecting from lower portions of the respective side walls. The card 127 has a thickness DT of 18.0 mm and each of the guide ribs has a thickness D1 of 3.3 mm, whereas the lower ends of the guide ribs are spaced from the bottom of the card by a distance Y of 0.85 mm, and the card has an overall width W2 of 54.0 mm including the guide ribs and has a width W1 of 51.0 mm without the guide ribs.

The type 3 card has a thickness D3 of 10.5 mm which is smaller than the thickness of the thick type card but is identical with the thick type card 127 in any other dimensions. The type 2 card has a thickness D2 of 5.0 mm and a width W2 of 48.0 mm but is identical with the thick type card 127 in any other respects. Finally, the type 1 card has a thickness D1 of 3.3 mm and a distance Y of 0 mm between the lower ends of the guide ribs and the bottom of the card but identical with the cards of the type 2 in any other respects. Regardless of the type, each card is provided with a terminal section (127a, 129a or 129b) conforming to the PCMCIA standard, which is to be connected to the connector 300 or 302 arranged in the card slot 125 or 126.

As described above, the guide ribs 310 of the cards of any type have common dimensions, and each card is inserted into the first or second card slot 125 or 126 while the guide ribs 310 are guided by the guide grooves 303 or the guides of the card slots. Thus, the first card slot 125 can selectively receive any one of the cards of any types, whereas the second card slot 126 can electively stores one of cards of type 1 and type 2 which are normally designed to be frequently loaded and unloaded.

Figure 16:
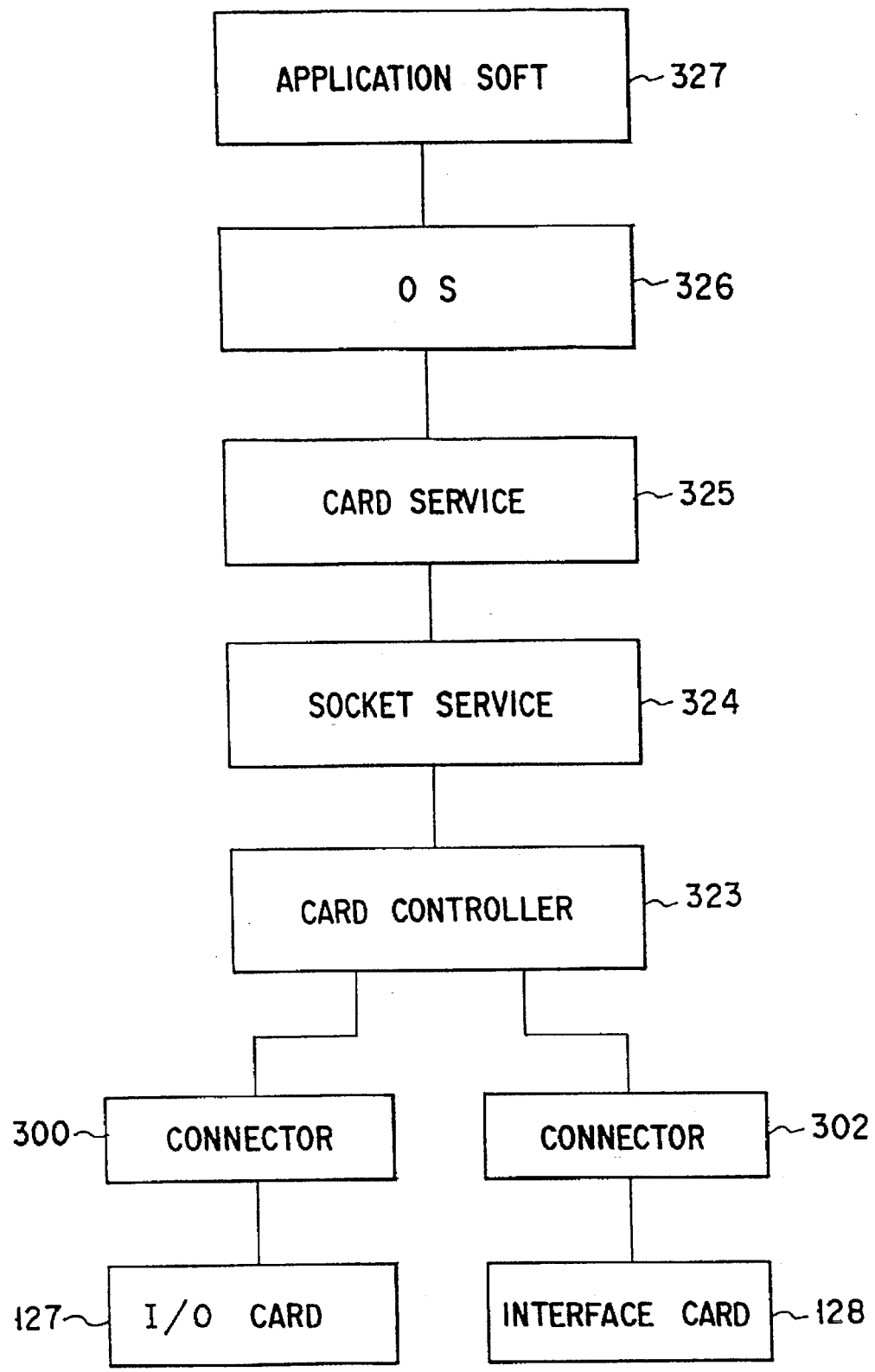

FIG. 16 illustrates the control system for controlling the cards loaded in the first and second card slots 125 and 126. The card loaded in the first card slot 125, typically an I/O card 127, is connected to a card controller 323 via the connector 300. The card loaded in the second card slot 125, typically an interface card 128, is connected to the card controller 323 via the connector 302. The card controller 323 is controlled by a socket service 324 and a card service 325 of a BIOS-ROM.

The card controller 323 is then connected to the internal bus of the computer to specify an address space to be used to access the cards 127 and 128, control read/write operations and detect card insertions and ejections. The socket service 324 basically has basic function required to control hardware and is capable of coordinating the cards 125 and 126, the card controller 323 and other pieces of hardware of different functional levels. The card service 325 defines the application software interface required to access the cards 125 and 126 from a given application program by using OS (operating system) 326.

As described above, the computer is equipped with the first card slot 125 capable of storing the thick type card, and the second card slot 126 for receiving a thin card of type 1 or type 2. Thus, the computer can be operated while two cards are simultaneously stored in the first and second card slots 125 and 125, for example, while the first card slot stores a selected type of card, e.g., an I/O card and the second card slot stores a card such as a security card which is frequently inserted and ejected from the slot. As a result, the computer can be obtained a high expansion capability.

Figure 17:
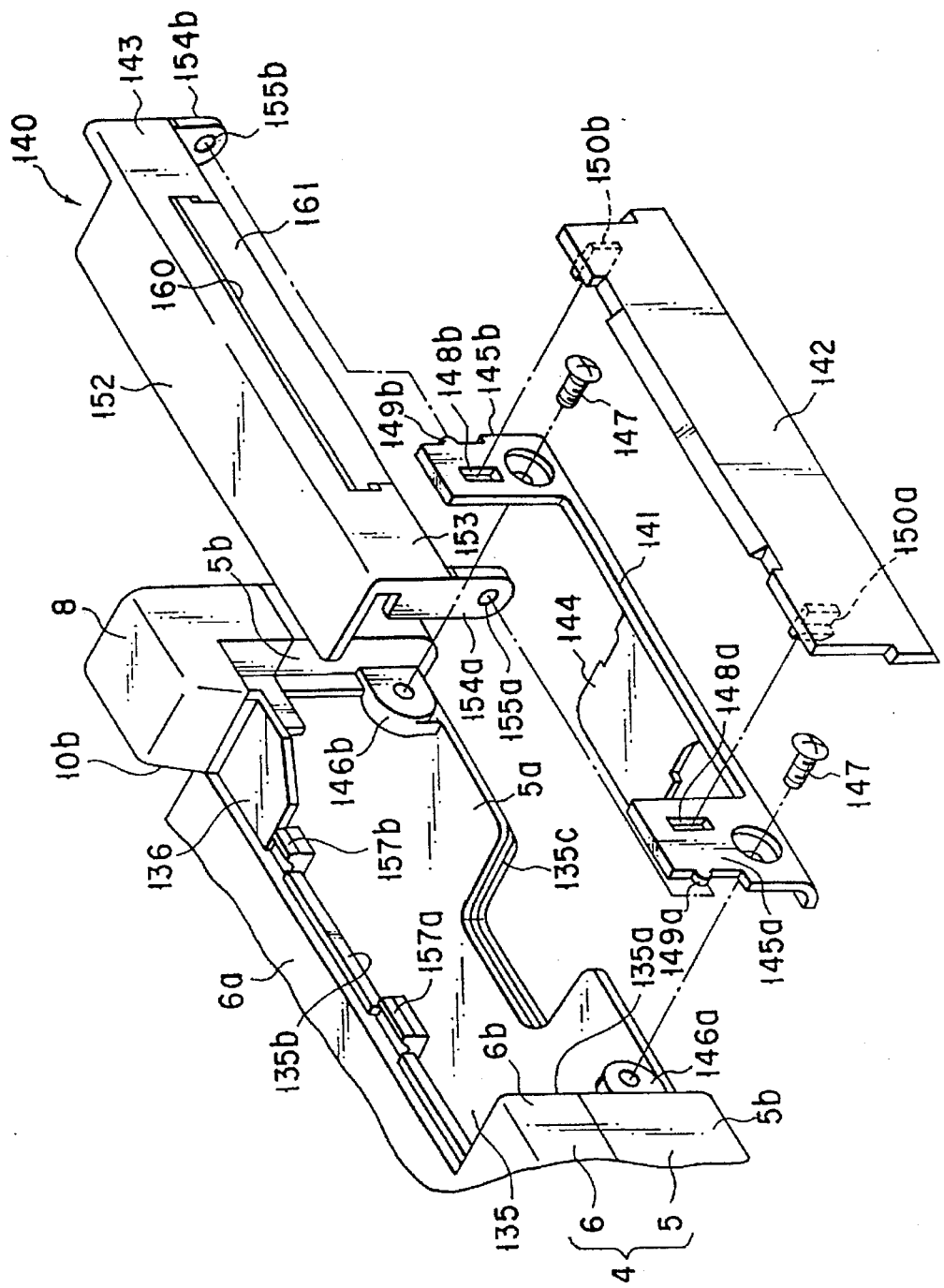

As shown in FIGS. 14 and 17, the housing 4 has in its rear half an opening 135 that communicates with the first and second card slots 125 and 126. The opening 135 specifically comprises a side opening 135a formed through the right side wall of the housing 4, a top opening 135b arranged through the top wall 6a of the top cover 6 and extending from the side opening 135a, and a bottom opening 135c cut through the bottom wall 5a of the bottom case 5 and also extending from the side opening 135a. A flat receiving portion 136 is horizontally extending from and located adjacent to the edge of the top wall 6a that defines an end of the top opening 135b.

Figure 18:
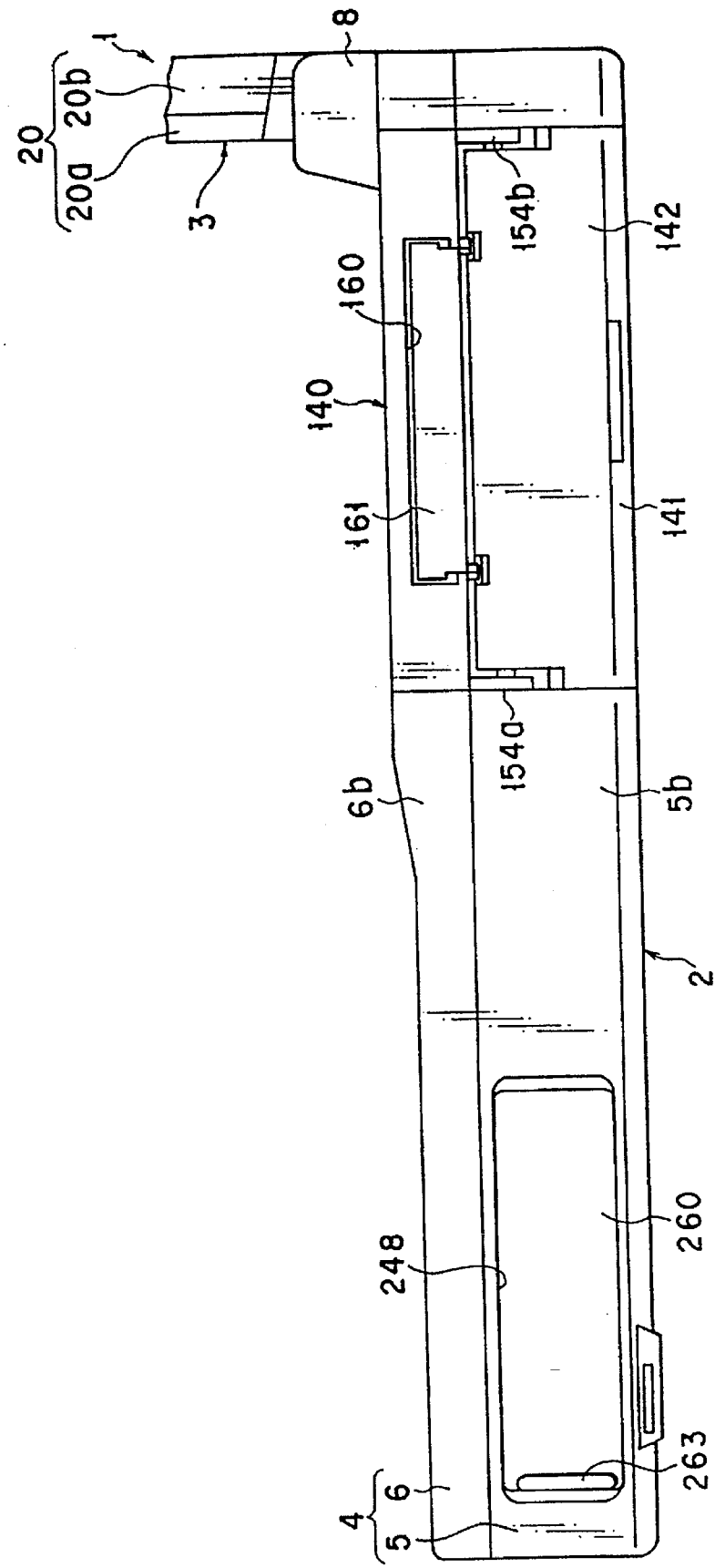

As illustrated in FIGS. 14, 17 and 18, a cover 140 is fitted to the housing 4 to cover the opening 135. The cover 140 comprises a cover support 141 to be rigidly fitted to the bottom case 5 of the housing 4, a first cover member 142 removably fitted to the cover support 141, and a second cover member 143 fitted to the cover support 141 and rotatable between an opened position and a closed position.

The cover support 141 includes a flat fitting portion 144 to be received in the bottom opening 135c, and a pair of vertical support walls 145a, 145b extending from the fitting portion 144 and fitted into the side opening 135a. The support walls 145a, 145b are separated from each other in the depth direction of the housing 4 and located in the side opening 135a. These support walls 145a, 145 are rigidly fitted to respective bosses 146a, 146b of the bottom case 5 by means of screws 147 and have a height substantially equal to that of the side wall 5b of the bottom case 5. Additionally, the support walls 145a, 145b are respectively provided with engaging holes 148a, 148b and pivots 149a, 149b.

The first cover member 142 is used to selectively conceal and expose the first card slot 125 and is formed as an oblong flat plate extending between the support walls 145a and 145b. The first cover member 142 is designed to conceal the lower half of the side opening 135a and provided with a pair of engaging projections 150a, 150b at locations facing the support walls 145a, 145b. The first cover member 142 is fitted to the cover support 141 to cover the first card slot 125 from the outside when the engaging projections 150a, 150b are releasably engaged with respective engaging holes 148a, 148b formed in the support walls 145a, 15b. Under this condition, the outer surface of the first cover member 142 is flush with that of the side wall 5b of the bottom case 5 and constitutes part of the side wall 5b.

The second cover member 143 is designed to selectively conceal the second card slot 126 and comprises a top wall section 152 for closing the top opening 135b and a side wall section 153 extending from the top wall section 152 to close the upper half of the side opening 135a. Both the top wall section 152 and the side wall section 153 have a flat and oblong form extending in the depth direction of the housing 4. The side wall section 153 is provided with a pair of legs 154a, 154b downwardly extending from its front and rear ends respectively. The legs 154a, 154b are used to hold the vertical walls 145a, 145b of the cover support 141 from the front side and the rear side respectively. The legs 154a, 154b are provided with respective bores 155a, 155b for rotatably receiving the respective pivots 149a, 149b. Once the pivots 149a, 149b are set in the respective bores 155a, 155b, the second cover member 143 becomes rotatable around the pivots 149a, 149b between a closed position where it conceals the top opening 135b and the upper half of the side opening 135a and an opened position where it gets to expose the openings 135b and 135a as it is rotated counterclockwise.

When the second cover member 143 is rotated in its closed position, the upper surface of the top wall section 152 is coplanar with the upper surface of the top wall 6a of the top cover 6 and, at the same time, the outer surface of the side wall section 153 is also coplanar with the outer surface of the side wall 6b of the top cover 6 to appear as if an integral part of the top cover 6. Under this condition, the top wall section 152 is located on the receiving portion 136 within the top opening 135b to suppress any upward displacement of the top cover 6.

When the second cover member 143 is rotated to its closed position, anchoring projections 156, 156 arranged along the front edge of the top wall section 152 are engaged with respective hooks 157a, 157b projecting from the corresponding edge of the top wall 6a to hold the second cover member 143 in the closed position as may be seen from FIG. 14.

As illustrated in FIGS. 14, 17 and 18, the side wall section 153 of the second cover member 143 is provided with a terminal access opening 160 leading to the second card slot 126. The terminal access opening 160 extends in the depth direction of the housing 4 and is opposite to the terminal section 129b of the interface card 128 in the second card slot 126.

A lid plate 161 for opening and closing the terminal access opening 160 is fitted to the side wall section 153. It is made of a plate, having an oblong front view corresponding to that of the terminal access opening 160, and provided with a pair of pivots 162 and a pair of anchoring projections 163 arranged lengthwise near the respective side ends (only one of the pivots and one of the anchoring projections are shown in FIG. 14). The pivots 162 are rotatably held at the respective edges of the side wall section 153 defining the terminal access opening 160 so that the lid plate 161 may be rotatable around the pivots 162 between a closed position where it covers the terminal access opening 160 and an opened position where it gets to expose the terminal access opening 160 as it is rotated counterclockwise. When the lid plate 161 is placed in its closed position, the anchoring projections 163 are engaged with the edge of the side wall section 153 defining the terminal access opening 160 to hold the lid plate 161 in the closed position. Under the closed condition, the outer surface of the lid plate 161 is coplanar with the outer surface of the side wall section 153 of the cover member 142, thereby constituting part of the side wall section 153.

With the cover 140 having a configuration as described above, when the lid plate 161 is opened while the interface card 128 is loaded in the second card slot 126 as illustrated in FIG. 14, the terminal section 129b of the interface card 128 is exposed to the outside through the terminal access opening 160 so that the connector of an external expansion device may be connected to the terminal section 129b without opening the second cover member 143.

Figure 19:
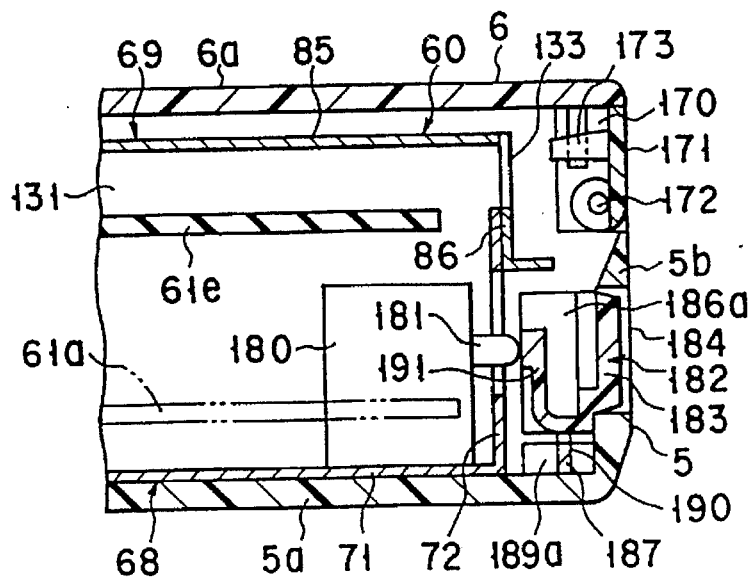
Figure 20:
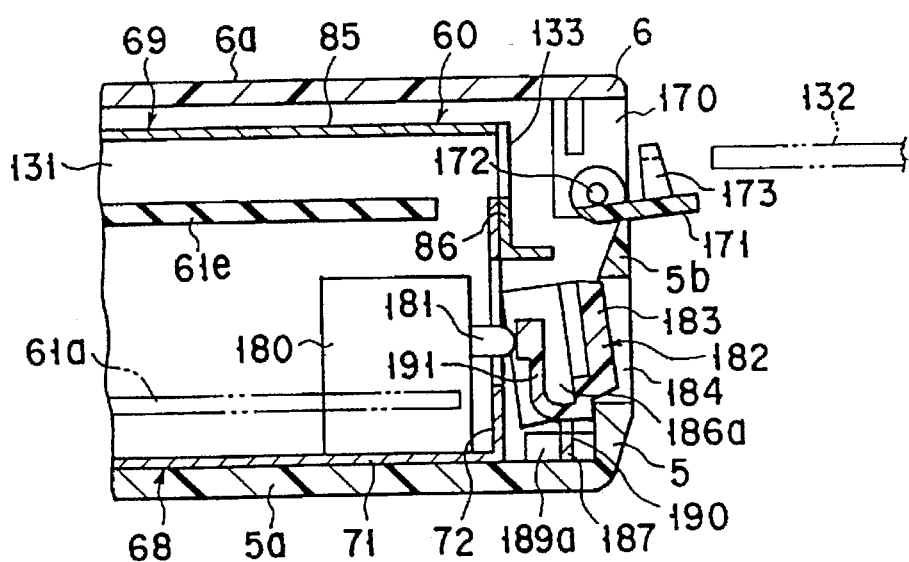

As illustrated in FIGS. 5, 19 and 20, the board unit 60 is provided at its left end with a third card slot 131 disposed between the fifth circuit board 61e and the base plate section 85 of the second shield plate 69. This third card slot 131 is provided with a card insertion port 133 cut through the left side wall of the shield frame 62. The third card slot 131 is designed to receive another expansion card 132 through the card insertion port 133. A connector (not shown) to be connected to the card 132 is arranged on the fifth circuit board 61e.

As shown in FIGS. 5, 19 and 20, a card inserting slot 170 is cut through the rear half of the left side wall of the housing 4, leading to the third card slot 131. More specifically, the card inserting slot 170 is formed in the side wall 6b of the top cover 6 and extends in the depth direction of the housing 4.

The side wall 6b of the top cover 6 is provided with a lid plate 171 for closing and opening the card inserting slot 170. The lid plate 171 has an oblong front view conforming to that of the card inserting slot 170 and is provided at its front and rear ends with a pair of pivots 172 and a pair of anchoring projections 173 (only one of the pivots and one of the projections are shown in FIGS. 19 and 20). The pivots 172 are rotatably held at the respective edges of the side wall 6b defining the card inserting slot 170 so that the lid plate 171 is rotatable around the pivots 172 between a closed position where it covers the card inserting slot 170 and an opened position where it gets to open the card inserting slot 170 as it is rotated lift side.

When the lid plate 171 is placed in its closed position, the anchoring projections 173 are engaged with the respective edges of the side wall 6b defining the card inserting slot 170 to hold the lid plate 171 to the closed position. Under the closed condition, the outer surface of the lid plate 171 is coplanar with the outer surface of the side wall 6b of the top cover 6 and constitutes part of the side wall 6b.

As illustrated in FIGS. 5, 19 and 20, the board unit 60 is provided with a power switch 180 at its left side end. The power switch 180 comprises a depressible actuator 181 projecting through the left side wall of the shield frame 62, or the upright section 72 of the first shield plate 68, toward the side wall 5b of the bottom case 5.

A synthetic resin control button 182 to be used for turning on and off the power switch 180 is arranged on the side wall 5b of the bottom case 5. As illustrated in FIGS. 21 and 22, the control button 182 has a rectangular push pad 183 to be depressed by a finger tip of the operator. The pad 183 is exposed from the left side of the bottom case 5 through a hole 184 cut through the side wall 5b. A pair of stopper walls 185a, 185b are arranged to the opposite lateral sides of the pad 183 so that, once the pad is set in position, they project toward the upright section 72 of the first shield plate 68. The stopper walls 185a, 185b are provided as integral part thereof with respective support members 186a, 186b extending downward. The lower ends of the support members 186a, 186b are mutually connected by a flat and oblong coupling portion 187. The support members 186a, 186b and the coupling portion 187 are resiliently deformable. The coupling portion 187 is located below the pad 183 and placed on the bottom wall 5a of the bottom case 5.

A pair of support walls 189a, 189b are formed on the bottom wall 5a of the bottom case 5 and located under the hole 184. The support walls 189a, 189b are provided on the upper edges with grooves 190, 190 into which the coupling portion of the control button 182 is fitted. Thus, the control button 182 is held on the bottom wall 5a of the bottom case 5 by way of the coupling portion 187 so that the pad 183 is in the hole 184 and in parallel to the side wall 5b by means of the resilient force of the coupling portion 183 and the support members 186a, 186b.

When the push pad 183 is depressed with a finger tip as shown in FIG. 20, the coupling portion 187 is deformed along with the support members 186a, 187 until the pad 183 is pushed into the bottom case 5 and the stopper walls 185a, 185b abut the upright section 72. The stroke of movement of the pad 183 is defined by the stopper walls 185a, 185b.

The push pad 183 has on its lower end of the back side a pusher lug 191 extending upward as integral part thereof. The pusher lug 191 is resiliently deformable to move toward and away from the pad 183, and its free upper end is held in contact with the actuator 181. Thus, as the pad 183 of the control button 182 is depressed with a finger tip, the actuator 181 is pushed back by the pusher lug 191 to turn on or off the power switch 180.

With the power switch 180 configured as described above, the push pad 183 can be depressed until the stopper walls 185a, 185b abut the shield frame 62. Since the resiliently deformable pusher lug 191 is disposed between the pad 183 and the actuator 181, even when the stroke of the pad 183 is increased due to deformation of the stopper walls 185a, 185b and the like, any excessive stroke of the pad 183 can be absorbed by the elastic deformation of the pusher lug 191. Thus, as the push button 182 is pushed, the actuator 181 can be prevented from being subjected to excessive load, thereby preventing damage or other trouble with of the power switch 180.

Figure 27:
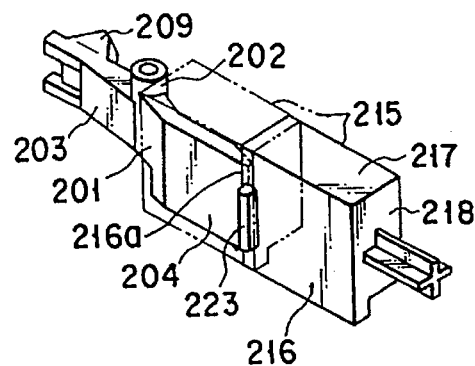

As illustrated in FIGS. 7 and 23, the bottom case 5 contains in the left end of the front half a lock mechanism 200 for manually releasably locking a battery pack 50 in the battery storage section 53. The lock mechanism 200 comprises a lock lever 201 for releasably engaging the case 51 of the battery pack 50. The lock lever 201 is located between the left side portion of the peripheral wall 5b of the bottom case 5 and the left side guide wall 52a. The lock lever 201 comprises, as illustrated in FIG. 27, a cylindrical boss 202, an engaging arm 203 extending from the outer periphery of the boss 202, and an pressing arm 204 also extending from the outer periphery of the boss 202 in a direction opposite to that of the engaging arm 203. The boss 202 is rotatably supported by a pivot 205 standing on the bottom wall 5b of the bottom case 5 so that the engaging arm 203 and the pressing arm 204 are rotatable around the pivot 205.

The left side guide wall 52a has, as illustrated in FIG. 7, a notched portion 207 opening to the battery storage section 53. The notched portion 207 is located to oppose the engaging arm 201 of the lock lever 201 so that the engaging arm 203 and the corresponding side of the case 51 come to face each other through the notched portion 207. Additionally, the case 51 of the battery pack 50 is provided on its side wall with an engaging recess 208 which faces the notched portion 207 when the battery pack 50 is properly loaded into the battery storage section 53. Then, the engaging recess 208 is located opposite to an engaging tip 209 formed on the free end of the engaging arm 203.

As seen from FIGS. 23, 24A and 24B, a torsion coil spring 210 as a first spring is arranged behind the lock lever 201. The torsion coil spring 210 comprises a coiled section 210a supported on a support pillar 211 standing on the bottom wall 5a, and a pair of arms 210b, 210c extending from the coil section 210a. The free end of the arm 210b is anchored to the bottom case 5 whereas the free end of the arm 210c is hooked on the engaging arm 203. Thus, the lock lever 201 is urged by the spring 210 to rotate clockwise so that engaging tip 207 of the engaging arm 203 faces the notched portion 207 and projects into the battery storage section 53.

Thus, when the battery pack 50 is completely pushed into the battery storage section 53, the engaging tip 207 comes to engage with the engaging recess 208, thereby locking the battery pack 50 in the battery storage section 53.

The bottom case 5 is provided on the left side portion of the peripheral wall with a window 213 through which a finger tip may go through upon releasing the lock. The window 213 is located to face the pressing arm 204 of the lock lever 201. As shown in FIG. 24B, when the pressing arm 204 is pushed by a finger tip inserted through the window 213, the lock lever 201 is rotated counterclockwise against the urging force of the torsion coil spring 210. As the lock lever 201 is rotated counterclockwise, the engaging tip 209 is disengaged from the engaging recess 208 to release the battery pack 50 out of the locked condition.

Figure 26:
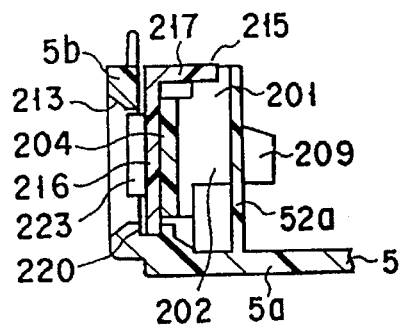

The lock mechanism 200 additionally comprises a shutter 215 for selectively closing and opening the window 213. The shutter 215 is located in front of the lock lever 201 and between the left side guide wall 52a and the peripheral wall 5b of the bottom case 5. As illustrated in FIGS. 26 and 27, the shutter 215 comprises a side wall section 216 extending along the inner surface of the peripheral wall 5b of the bottom case 5, a top wall section 217 extending horizontally from the upper end of the side wall section 216 toward the guide wall 52a, and a front wall section 218 connecting the front end of the top wall section 217 and that of the side wall section 216.

As shown in FIG. 26, the lower end of the side wall section 216 is slidably fitted in a guide groove 220 formed on the bottom wall 5a of the bottom case 5 and extending in the depth direction of the housing 4. The top wall section 217 and the front wall section 218 are slidably in contact with the guide wall 52a. Thus, while being guided by the guide wall 52a and the guide groove 220, the shutter 215 is slidable between a closed position where it is located between the window and the pressing arm 204 of the lock lever 201 to close the window and an opened position where it opens the window 213 to expose the pressing arm 204 of the lock lever 201. There is provided a compression coil spring 222 under a compressed condition between the front wall section 218 of the shutter 215 and a spring holder 221 disposed at the front end of the bottom case 5 so that the shutter 215 is constantly urged toward its closed position where it closes the window 213.

When the shutter 215 is in its closed position, the pressing arm 204 of the lock lever 201 is found inside the side wall section 216 of the shutter 215 and constantly pressed against the inner surface of the side wall section 216, as illustrated in FIG. 23. When the shutter is moved to its opened position as illustrated in FIG. 24A, the side wall section 216 of the shutter 215 leaves the pressing arm 204 to make the latter exposed to the outside through the window 213. At the same time, the lock lever 201 is rotated clockwise by an angle corresponding to the thickness of the side wall section 216 as it is urged to rotate by the torsion coil spring 210. Consequently, the front end of the pressing arm 204 comes to face the front edge 216a of the side wall section 216. If the shutter 215 is released from the finger tip that holds it, the front end of the pressing arm 204 is hooked by the front end of the pressing arm 204 as the shutter moves toward the closed position by the urging force of the compression coil spring 222, so that the shutter 215 is held to its opened position against the urging force of the compression coil spring 222.

Figure 28:
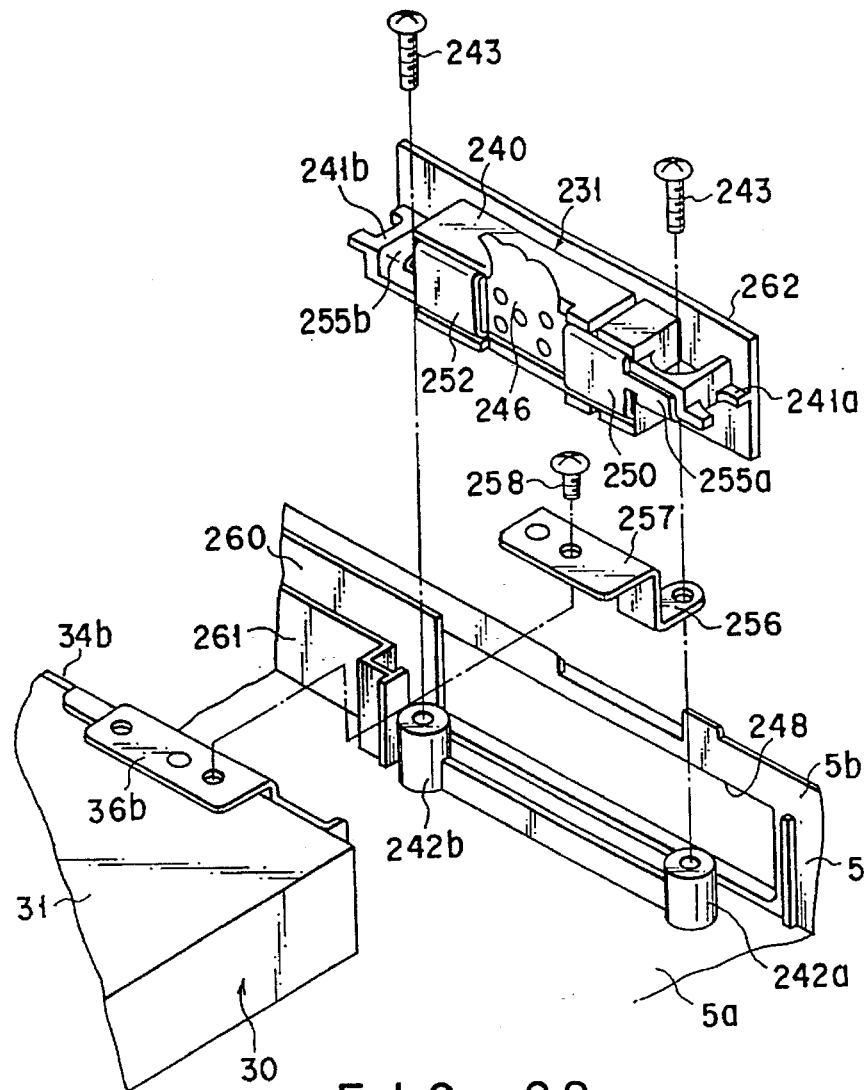

The side wall section 216 is provided with a finger tip receiving rib 223 facing the window 213. As illustrated in FIGS. 1, 18 and 28, the bottom case 5 is equipped on its right side of the front half with an expansion connector 231 to which a track ball 230 is to be connected. A track ball 230 is one of the pointing devices used for specifying a particular position on the screen of the liquid crystal display 21 and, as shown in FIG. 32, provided with a spherical control section 233 on the upper surface of its main body case 232. An operator can shift the cursor position in the display screen and perform other operations by appropriately rotating the control section 233 with a finger tip. The main body case 232 is provided at its one end with a connector 235 that may be removably fitted to the expansion connector 231. The connector 235 comprises a synthetic resin connector body 236 having a pair of engaging projections 236a, 236b and a pair of contact terminals 237, 237 arranged between the engaging projections 236a, 236b.

As illustrated in FIG. 28, the expansion connector 231 of the bottom case 5 is provided with a synthetic resin connector body 240. The connector body 240 is formed of an elongated box extending lengthwise in the bottom case 5, and is integrally provided with a pair of flanges 241a, 241b extending from the opposite longitudinal ends. The connector body 240 is arranged along the right side portion of the peripheral wall 5b of the bottom case 5 with the flanges 241a, 241b rigidly secured to a pair of respective bosses 242a, 242b projecting upward from the bottom wall 5a by means of screws 243. As shown in FIG. 31, the connector body 240 is located to the right of the FDD 30.

As shown in FIG. 29, the connector body 240 is also provided with a pair of engaging recesses 244 to which the engaging projections 36a, 36b of the connector 235 are removably fitted. The recesses 244 are arranged opposing the right side portion of the peripheral wall 5b of the bottom case 5. A pair of terminal plates 245 are arranged between the engaging recess 244 to establish electric connection with the respective contact terminals 237, 237. The terminal plates 245 are electrically connected to the board unit 60 through a flexible connecting board 246. The engaging recesses 244 and the connector plates 245 of the connector body 240 are exposed to the outside through an elongated connector access opening 248 formed in the peripheral wall 5b of the bottom case 5.

The connector body 240 is molded with a metal conductor plate 250 as integral part thereof. The conductor plate 250 has a first exposed area 251 connecting the tops and the bottoms of the engaging recesses 244 and a pair of second exposed areas 252 extending from the first exposed area 251 and arranged on the rear surface of the connector body 240. As shown in FIG. 29, the first exposed area 251 extends closer to the outer extremities of the engaging recesses 244 than the terminal plates 245 and also to above and below the terminal plates 245, 245.

As illustrated in FIG. 28, the second exposed areas 252 are provided with respective grounding terminals 255a 255b. In this embodiment, one of the grounding terminals, or the terminal 255a, is laid under the lower surface of the front flange 241a, whereas the other grounding terminal 255b is laid on the upper surface of the rear flange 241b. A grounding metal fitting 256 is interposed between the grounding terminal 255a and the boss 242a and secured to the boss 242a by means of a screw 243. A grounding metal fitting 256 has as an integral part thereof a conductive member 257, which conductive member 257 is secured onto the lug 36b by means of a screw 258 and receives thereon the shield plate 105. Thus, conductor plate 250 of the connector body 240 is electrically connected to the casing 31 and the shield plate 105 via the grounding terminal 255a and the grounding metal fitting 256.

With such an arrangement, the electrostatic charge that may have been accumulated on the contact terminals 237 and/or the terminal plates 245 can be discharged therebetween when the connector 235 of the track ball 230 is connected to the expansion connector 231. However, since the expansion connector 231 is molded as integral part thereof with the conductor plate 250 having the first exposed area 251 extending closer to the outer extremities of the engaging recesses 244 than the terminal plates 245 and also to above and below the terminal plates 245, the first exposed area 251 approaches the contact terminals 237 before it approaches the terminal plates 245 when the two connectors are put together so that any accumulated electrostatic charge may be discharged firstly between the first exposed area 251 and the contact terminals 237. Because the conductor plate 250 is electrically connected to the casing 31 of the FDD 30 via the grounding metal fitting 256, the electrostatic charge will be safely led to the casing 31 of the FDD 30 and then to the shield plate 105 for discharging.

The bottom case 5 is provided with a shutter plate 260 for selectively closing and opening the connector access opening 248. The shutter plate 260 has a rectangular plan view that corresponds to that of the connector access opening 248 and slidable lengthwise along the right side portion of the peripheral wall 5b of the bottom case 5 between a closed position where it covers the connector access opening 248 and an opened position where it exposes the connector access opening 248 and hence the engaging recesses 244 of the connector body 240.

As shown in FIGS. 28 and 31, a guide wall 261 is arranged on the bottom wall 5a of the bottom case 5 to slidably hold the shutter plate 260 between the peripheral wall 5b of the bottom case 5 and itself. The guide wall 261 is located behind the connector body 240 and has a flat wall section 262 extending forward from the front end of the guide wall 261 and between the connector body 240 and the peripheral wall 5b. The wall section 262 is designed to hold the shutter plate 260 between the peripheral wall 5b and itself. Therefore, it may be understood that the expansion connector 231 operates also as a guide wall for guiding the sliding movement of the shutter plate 260.

The shutter plate 260 is equipped with a rib 263 for receiving a finger tip coming into the connector access opening 248.

Next, there will be described a method of assembling the FDD 30, HDD 40, battery pack 50, and board unit 60 in the bottom case 5 with respect to the computer 1 having the above-mentioned arrangement.

Firstly, an FDD 30, an HDD 40, a battery pack 50 and a board unit 60 are placed on the respective proper positions on the bottom wall 5a of the bottom case 5. 10 Then, the lug 95b extending from the connecting board 70 of the shield frame 62 is laid on the upper surface of the metal casing 31 of the FDD 30 and the slot 94 formed near the left side of the connecting board 70 is aligned with the leading end of the battery pack 50. Now, the board unit 60 is partly superposed on the FDD 30 and the battery pack 50.

Thereafter, the lug 95a extending from the connecting board 70 of the board unit 60 is secured to the corresponding boss 46 together with the fixture 45b of the HDD 40 by means of a screw 47 and the other lug 95b is secured to the other boss 46 also by means of a screw 47.

Under this condition, the shield plate 105 is placed on the FDD 30, the HDD 40, the battery pack 50 and the board unit 60. Then, the main section 105a of the shield plate 105 is secured to the brackets 34a, 34b of the FDD 30 by means of screws, and the lugs 106 arranged along the edges of the main section 105a are secured to the respective bosses 46 also by means of screws. Note that one of the lugs 106 is placed on the fixture 45a and then secured to the corresponding boss 46 together with the fixture 45a, as shown in FIG. 4.

At the same time, the connector member 111 of the extension 110 of the shield plate 105 is secured to the rear end of the shield frame 62 by means of screws so that the extension 110 may not lift unintentionally. When the shield plate 105 is secured to the bosses 46 by means of screws, the FDD 30, the HDD 40, the battery pack 50 and the board unit 60 are held between the shield plate 105 and the bottom wall 5a of the bottom case 5, so that these functional components are rigidly secured to their proper positions on the bottom wall 5a.

As described above, according to the embodiment of the present invention, the FDD 30, the HDD 40, the battery pack 50 and the board unit 60 of the above embodiment are securely held between the shield plate 105 and the bottom wall 5a by simply securing the shield plate 105 that carries thereon these functional components to the bosses 46 by means of screws. Thus, a plurality of functional components can be aligned and secured in a very simplified manner.

Accordingly, the assembling of the computer 1 can be easily carried out without requiring the functional components 30, 40, 50 and 60 to be individually and sequentially secured by means of screws in a lengthy manner as in the case of conventional portable computers.

Besides, it is not necessary to provide many bosses on the bottom wall 5a at positions individually corresponding to the functional components 30, 40, 50 and 60. Thus, the total number of bosses to be formed on the bottom wall 5a can be reduced, so that the bottom wall 5a of the bottom case 5 can be formed in a simple shape without concave or convex portions. In accordance with the reduction of the number of bosses, the bottom case 5 may show a simple structure and those spaces which are defined for arranging conventional bosses can be used as spaces for receiving components.

Because more space is made available within the bottom case 5, the functional components 30, 40, 50 and 60 may be placed very close to the bottom wall 5a and any adjacent ones of the functional components 30, 40, 50 and 60 may be brought closer to each other on the bottom wall 5a to reduce the overall space required for the components.

With the computer 1 having the configuration as described above, since the lugs 95b of the board unit 60 to be secured to the bosses 46 are partly placed on the casing 31 of the FDD 30, the FDD 30 may be pressed against the bottom wall 5a by way of the lugs 95b. In other words, the adjacently arranged board unit 60 and the FDD 30 can be securely fitted to the bottom wall 5a by a single operation of driving screws 47 into the bottom wall 5a, thereby reducing the total number of portions to be screwed and simplifying the assembling operation.

Additionally, since the fixture 45b of the HDD 40 and the lugs 95a of the board unit 60, and the fixture 45a of the HDD 40 and the lug 106 of the shield plate 105 are commonly secured to the respective bosses 46, the total number of screws 47 and bosses 46 can be further reduced, thereby simplifying the assembling operation and increasing the mounting space in the bottom case 5.

Furthermore, since the shield plate 105 is used as the fixture plate for holding the functional components 30, 40, 50 and 60 between itself and the bottom wall 5a, any high frequency noises generated by the functional components 30, 40, 50 and/or 60 during operation can be shielded within the housing 4. Thus, interference of radio and telecommunications due to leakage of the high frequency noises can be prevented.

Moreover, the FDD 30, the battery pack 50 and the board unit 60 can be released from the bottom case 5 by simply undoing the screws fastening the shield plate 105 to the bottom case 5 and separating the shield plate from the bottom case. The HDD 40 can also be released from the bottom case 5 by removing the shield plate 105 from the bottom case 5 and undoing a single screw fastening the fixture 45a to the bottom case 5. Thus, all the functional components 30, 40, 50 and 60 that comprise metal parts, the metal shield plate 105 and the synthetic resin bottom case 5 may be easily separated from one another.

This means that, when the computer 1 loses its service life, parts formed of synthetic resin and metal parts can be easily separated from each other, so that any parts can be easily recycled and can improve the problem of environmental pollution.

As described earlier, the board unit 60 of the above embodiment is realized by arranging first through third circuit boards 61a through 61c on a first shield plate 68 in two layers, while securing fourth and fifth circuit board 61d and 61e side by side onto a second shield plate 69, and then superposing the first and second shield plates 68, 69 with each other, so that the circuit boards 61a through 61e may be arranged in three layers. So the five circuit boards 61e through 61e connected one another through the flexible connecting boards 65a to 65d are kept in a multilayered manner before they are assembled in the bottom case 5.

Further, the circuit boards 61a to 61d are arranged in layers and are completely surrounded by the shield plates 68 and 69, and a single board unit 60 having a shielding effect is constructed by the circuit boards and the shield plate Thus, the housing 4 does not need to have a conductive layer for shielding noises.

Since both the first shield plate 68 and the second shield plate 69 are made of a metal plate, they are by far stronger than a conductive layer prepared by plating and, therefore, least liable to be damaged when the board unit 60 is mounted on the housing 4. Consequently, high frequency noises that may be generated from any of the circuit components 66 are effectively confined within the housing 4 to thereby improve the reliability of the computer. Additionally, since the housing 4 is provided on its inner surface with no conductive layer, the operation of mounting the circuit boards 61a to 61e can be carried out without paying particular attention to avoiding a collision between the circuit boards and the housing 4 which may adversely affect the efficiency of the mounting operation.

With the above-mentioned arrangement, since the circuit boards 61a to 61e form a unit with the first and second shield plates 68 and 69 are then mounted on the housing 4, the bottom case 5 only requires bosses arranged on the bottom wall 5a for securing the first shield plate 68. Thus, the housing 4 does not need to have many fixing portions to which the circuit boards are individually secured, so that the inside of the housing 4 may have a very simplified profile.

Further, the circuit boards 61a to 61e are rigidly held by the shield plates 68 and 69 within the housing 4 without the fear of being shaken, and it is possible to easily carry out the operation of mounting circuit boards 61a to 61e within a limited space inside the housing 4.

To upgrade the computer 1 having a configuration as described above by installing in the spare zone 101 of the board unit 60 an additional circuit component 100 such as a keyboard controller, the display unit 3 is firstly rotated to the third position, where the display unit 3 is away from the top cover 6. Under this condition, the top cover 6 and the keyboard unit 13 are removed from the bottom case 5 to expose the upper surface of the bottom case 5.

Now, the shield plate 105 covering the FDD 30, the HDD 40 and the battery pack 50 and the board unit 60 come to be exposed. Then, the shield plate 105 is taken out by undoing the screws 47 securely holding the shield plate 105 to the bottom case 5. Since the shield frame 62 of the board unit 60 arranged adjacent to the shield plate 105 has a cut out area 102 for exposing the spare zone 101, and the shield plate 105 has as an integral part thereof an extension 110 for concealing the spare zone 101, the spare zone 101 on the fourth circuit board 61d comes to be exposed as the shield plate 105 is moved away.

Therefore, without removing the board unit 60 from the bottom case 5 or exploding the board unit 60, a circuit components 100 may be installed into the spare zone 101 and the components currently installed in the spare zone 101 may be replaced by an upgraded circuit component 100. Thus, any operation of adding and/or replacing circuit component 100 can be carried out easily despite the fact that the circuit boards 61a to 61e are arranged in three layers.

In the above-mentioned embodiment, the circuit components 66 on the circuit boards 61a to 61d arranged in three layers generate heat to raise the temperature of the board unit 60. Since the third circuit board 61c disposed in the middle of the layers of the circuit boards 61a to 61d is dedicated to power supply, it generates heat at a considerable rate and the generated heat may be stored around it to thereby locally raise the temperature of a particular area of the board unit 60.

However, because of the fact that the shield plate 105 having a surface area substantially equal to the entire surface area of the rear half of the bottom case is held in contact with the shield frame 62 of the board unit 60 and that the shield frame 105 is provided with an extension 110 that directly covers the fourth circuit board 61d, the heat generated in the board unit 60 is efficiently transmitted to the large shield plate 105. Moreover, since the shield plate 105 is held in contact with the reinforcement plate 17 that covers the entire surface area of the underside of the keyboard unit 13 by way of the plate springs 107a and 107b, the heat transmitted to the shield plate 105 is further sent to the reinforcement plate 17, where it is radiated into the atmosphere.

Therefore, any heat in the board unit 60 can be effectively and efficiently transmitted to the shield plate 105 and then radiated therefrom so that the board unit 60 is protected against the danger of storing heat in a particular area thereof. Thus, although the housing 4 of the computer 1 is made of a synthetic resin material that poorly transmits heat, the board unit 60 that generates heat at an enhanced rate can be reliably cooled without requiring a particularly designed cooling mechanism such as a fan.

Since a dedicated cooling mechanism is not required for the computer 1, the number of the components can be reduced and its components can be arranged within the housing 4 without the risk of overloading. Further, a problem of noise generated form a fan can be omitted.

With the computer 1, a battery pack 50 is loaded into the battery storage section 53 through the battery pack insertion opening 54 formed on the front side of the bottom case 5. As a lateral side of the case 51 of the battery pack 50 reaches the notched portion 207, the engaging tip 209 of the lock lever 201 gets in touch with the side of the cassette 51. Thus, the lock lever 201 is rotated counterclockwise to allow the insertion of the battery pack 50. When the battery pack 50 is inserted into the storage section 53 until the battery pack 50 abuts the stoppers 56a, 56b, the engaging recess 208 of the case 51 faces the engaging tip 209 of the lock lever 201 and the engaging tip 209 comes to be engaged with the engaging recess 208 under the urging force of the torsion coil spring 210.

Then, the battery pack 50 is locked in the battery storage area 53 to become unretrievable from the area.

To unlock the battery pack 50, it is necessary to insert a finger tip into the housing 4 through the window 213 and hold the rib 223 of the shutter 215 and then slidingly move the shutter 215 to its open position against the urging force of the compression coil spring 222. Then, the lock lever 201 is urged to rotate clockwise by the torsion coil spring 210 and, since the front end of the pressing arm 204 of the lock lever 201 is held in contact with the inner surface of the side wall section 216 of the shutter 215, the inner surface of the side wall section 216 leaves the front end of the pressing arm 204 as the shutter 215 is moved to its open position. Then, as the side wall section 216 is moved away from the pressing arm 204, the lock lever 201 is rotated by an angle corresponding to the thickness of the side wall section 216 and the front end of the pressing arm 204 comes to face the front edge 216a of the side wall section 216. Because the shutter 215 is urged toward its closed section by the compression coil spring 222, the front edge 216a of the side wall section 216 of the shutter comes to be engaged with the pressing arm 204 so that the shutter 215 is held to its open position when the shutter 215 is released from the finger tip holding it.

Now, since the window 213 is open and the pressing arm 204 of the lock lever 201 is exposed to the outside through the window 213, it can be pushed inward by a finger tip. Then, the lock lever 201 is rotated counterclockwise against the urging force of the torsion coil spring 210 and the engaging tip 209 of the lock lever 201 is released from the engaging recess 208 of the battery pack 50. So, as long as the pressing arm 204 is pushed inward by a finger tip, the battery pack 50 is held in an unlocked condition and, therefore, it can be pulled out of the battery storage area 53 by holding the downward ridge 55 arranged at the front end of the bottom of the battery pack 50 with a finger tip.

When the pressing arm 204 is pushed inward, the front end of the pressing arm 204 is moved away from the front edge 216a of the side wall section 216 and, therefore, the shutter 215 is released at the same time. If the finger tip pushing the pressing arm 204 inward is pulled out of the window 213 to release the pressing arm 204, the shutter 215 is urged to slidingly come to the closed position by the resilient force of the compression coil spring 222 to automatically conceal the window 13.

With a lock mechanism 200 configured in a way as described above, the shutter 215 is engaged with the pressing arm 204 of the lock lever 201 and held to its position even when the shutter 215 is slidingly moved its open position and, therefore, it is not necessary to somehow hold the shutter 215 immovable while pushing the pressing arm 204 of the lock lever 201 inward. So, the existence of the shutter 215 for concealing the lock lever 201 does not interfere with the intended easy operation of the lock lever 201.

When the battery pack 50 is unlocked in the storage area 53 as the pressing arm 204 of the lock lever 201 is pushed inward, the engagement of the pressing arm 204 and the side wall section 216 of the shutter is released. Thus, if the finger tip is pulled out of the window 213, the shutter is slidingly moved to its closed position to automatically conceal the window 213. This is a foolproof system that never allows the window to be left open and the lock lever 201 to be falsely operated.

While the front end of the pressing arm 204 of the lock lever 201 is engaged with the front edge 216a of the shutter when the shutter 215 is moved to its open position in the above embodiment, the shutter 215 and the lock lever 201 may alternatively be so designed that the front end of the pressing arm 204 abuts the inner surface of the shutter 215 when the latter is moved to the open position, as illustrated in FIG. 33. With such an arrangement, since two actions of opening the shutter 215 and then pushing the pressing arm 204 of the lock lever 201 inward are required for relieving the locked condition of the lock mechanism 200, there will not be any risk of unintentionally undoing the fastened lock mechanism 200 while the computer is being shipped. Once the fastened condition of the lock mechanism 200 is relieved, the lock lever 201 is turned back to its locked position by simply releasing the finger tip that holds the pressing arm 204 and the shutter 215 and the shutter 215 is automatically moved back to the closed position by the resilient force of the spring 222. This is also a foolproof system that never allows the window 213 to be unintentionally left open and the lock lever 201 to be falsely operated.

It may be needless to say that the present invention is not limited to the above embodiment and various modifications may be made without departing the spirit and the scope of the invention.

For instance, while the shield plate of the above embodiment covers only functional components such as an FDD and an HDD, it may alternatively be integrally formed with a wall section extending downward from the peripheral edge of the shield plate to conceal the functional components from above and laterally.

Similarly, while the shield plate operates also as a fixture plate, an independent fixture plate may alternatively prepared. Such an independent fixture plate may be made of a synthetic resin material.

Components to be stored within the housing are not limited to those described above by referring to the embodiment such as a battery pack and may include expansion device such as a modem unit and hard disc drives.

While the circuit boards are arranged in three layers in the above embodiment, the number of layers of circuit boards is not particularly limited to three and circuit boards may alternatively be arranged in two layers by omitting the third support member and the third circuit board or as another alternative be arranged in four layers if additional circuit boards and support members are used.

Again, while first and second card slots are arranged in the above embodiment, only a single card slot that can accommodate a thick type card may alternatively be arranged. Then, the card slot can receive any card so long as it conforms to an appropriate set of the PCMICA standard and the overall space requirement for the portable computer can be significantly reduced.

The first and second card slots need not necessarily be arranged in two layers and may alternatively be arranged side by side on a same horizontal plane. They may still alternatively be so designed as to accommodate cards conforming to an applicable standard other than the PCMCIA standard.

Finally, the present invention is not limited to book- or notebook-shaped portable computers and may be applied to other portable electronic apparatuses such as word processors.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A compact electronic apparatus comprising:

a substantially rectangular housing having a peripheral wall;

a card storage section having a insertion opening arranged on the peripheral wall and formed in a size capable of storing a function expansion card having the largest permissible dimensions conforming to a given standard, for selectively storing one of the function expansion cards having different dimensions conforming to said standard;

a connector conforming to said standard and arranged within the card storage section, for connection with the expansion card stored in the card storage section; and a cover closing an insertion opening.

2. A compact electronic apparatus comprising:

a substantially rectangular housing having a peripheral wall;

a card storage section having an insertion opening arranged on the peripheral wall and formed in a size capable of storing a function expansion card having the largest permissible dimensions conforming to a given standard, for selectively storing one of the function expansion cards having different dimensions conforming to said standard;

a connector conforming to said standard and arranged within the card storage section, for connection with the expansion card stored in the card storage section; and a projection protruding into the card storage section, for abutting the surface of the expansion card stored in the card storage section.

* * * * *